Nov. 18, 1958   R. A. BURGY   2,860,728
ELEVATOR CONTROLS
Filed Jan. 2, 1957   11 Sheets-Sheet 1
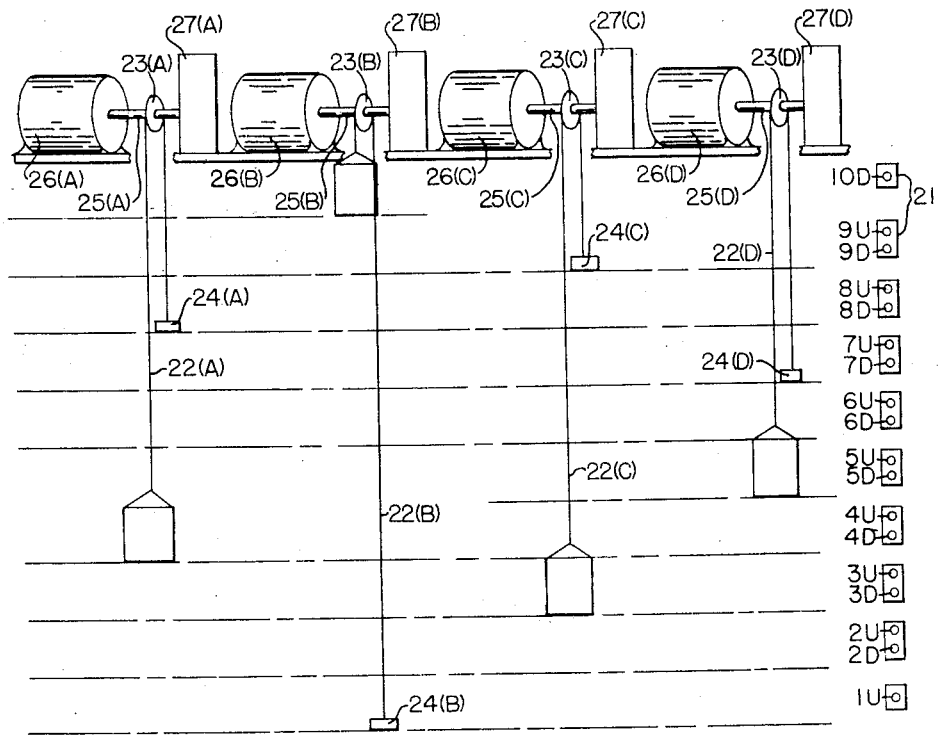
Fig. I
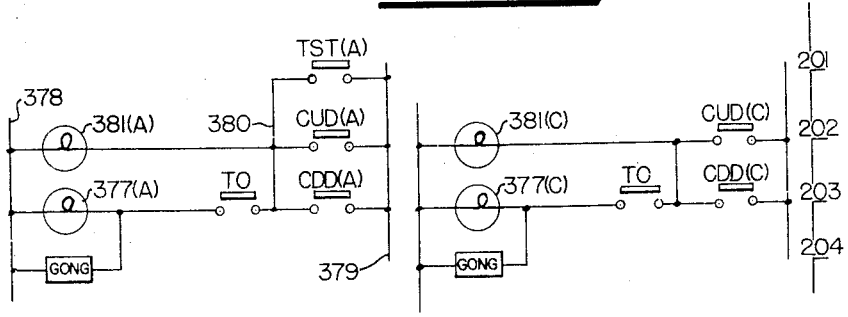
Fig. XIII
INVENTOR.
RAYMOND A. BURGY
BY
Marshall, Marshall & Geasting
ATTORNEYS Nov. 18, 1958   R. A. BURGY   2,860,728
ELEVATOR CONTROLS
Filed Jan. 2, 1957   11 Sheets-Sheet 2
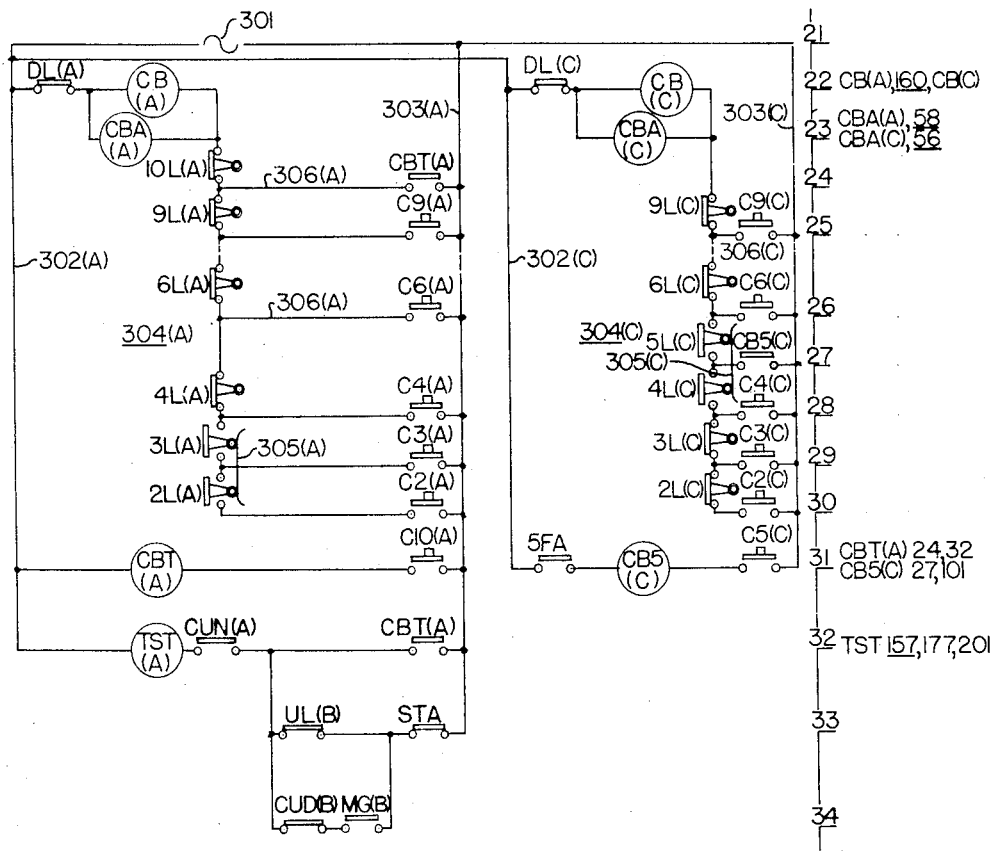
Fig. II
INVENTOR.
RAYMOND A. BURGY
BY
Marshall, Marshall + Yeasting
ATTORNEYS

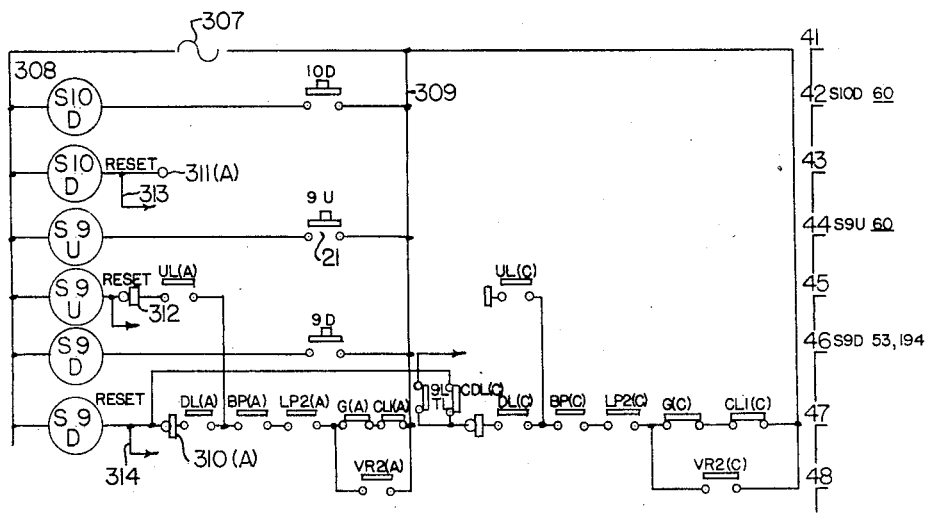
_Fig. III_
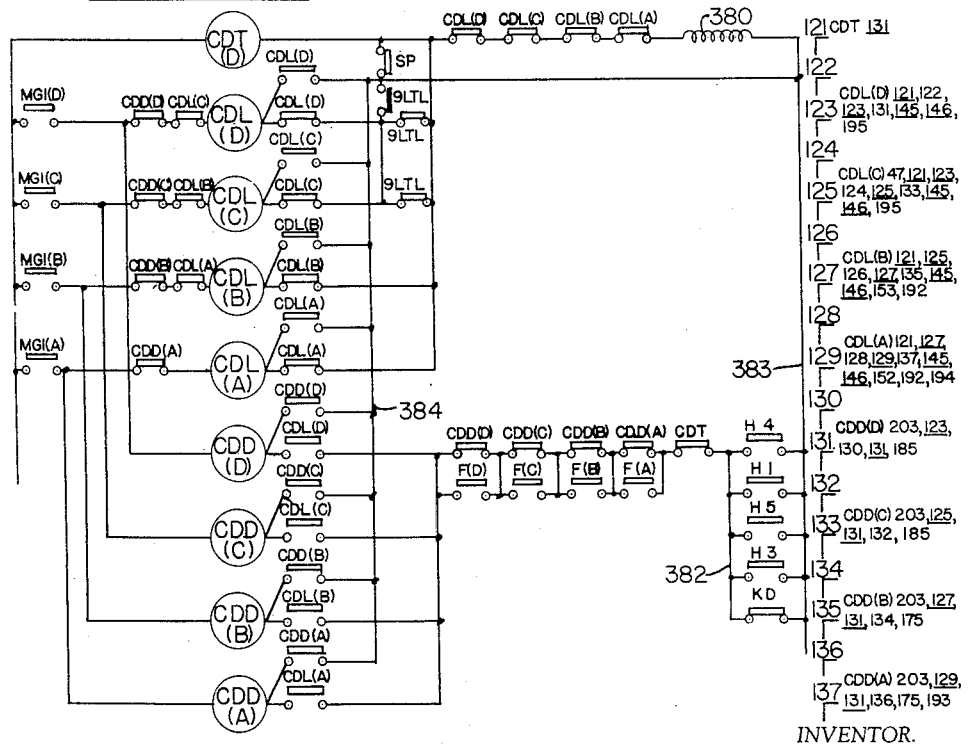
_Fig. VIII_
INVENTOR.
RAYMOND A. BURGY
BY
Marshall, Marshall & Yeasting
ATTORNEYS

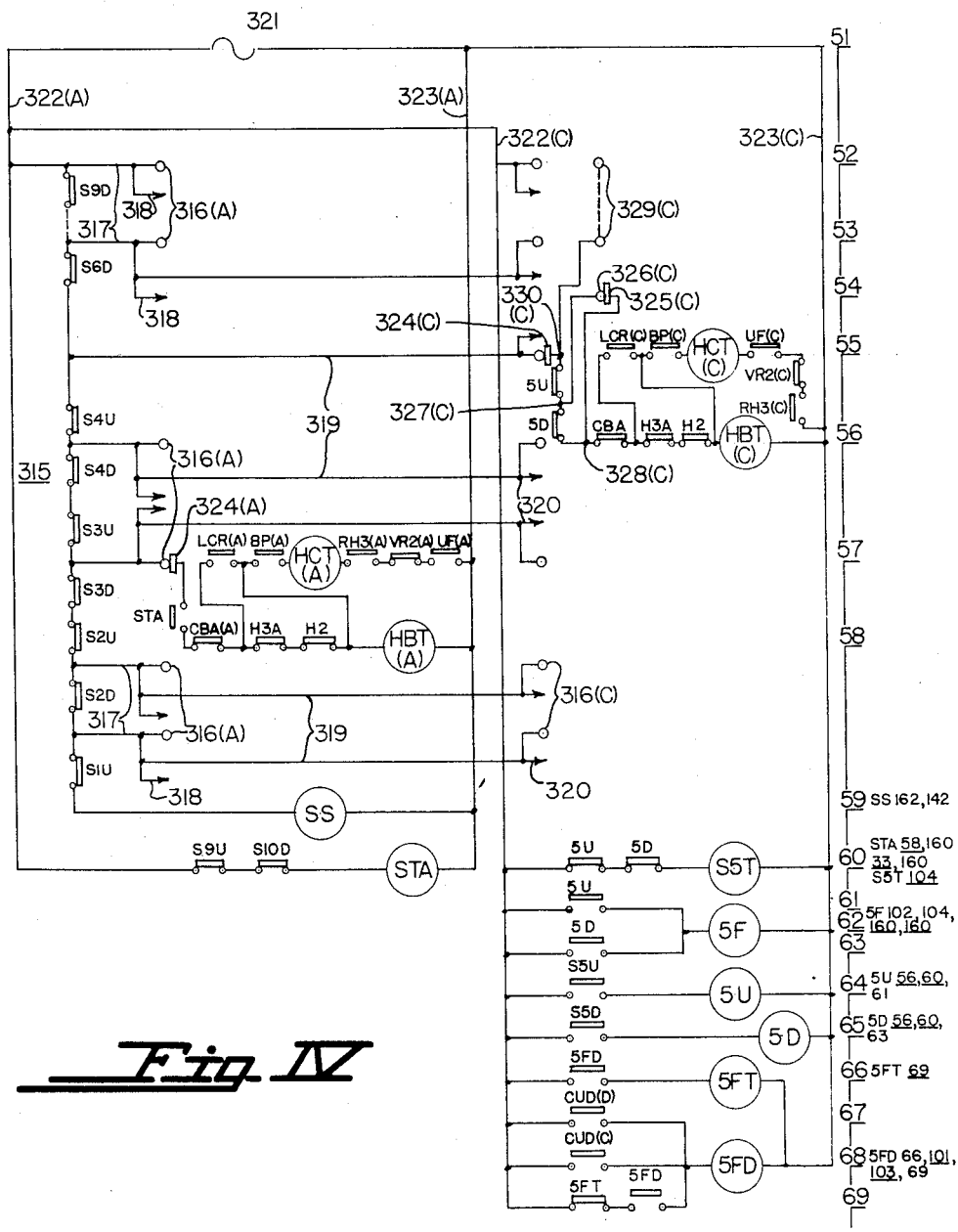
Fig. IV

Nov. 18, 1958    R. A. BURGY    2,860,728
ELEVATOR CONTROLS
Filed Jan. 2, 1957    11 Sheets-Sheet 5
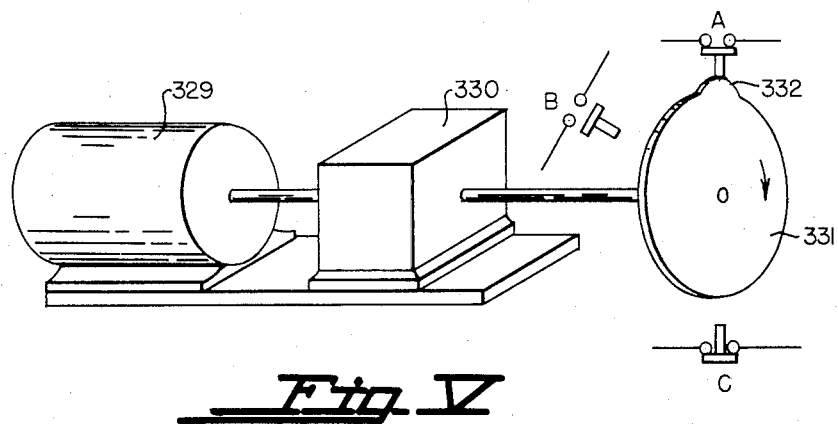
Fig. V
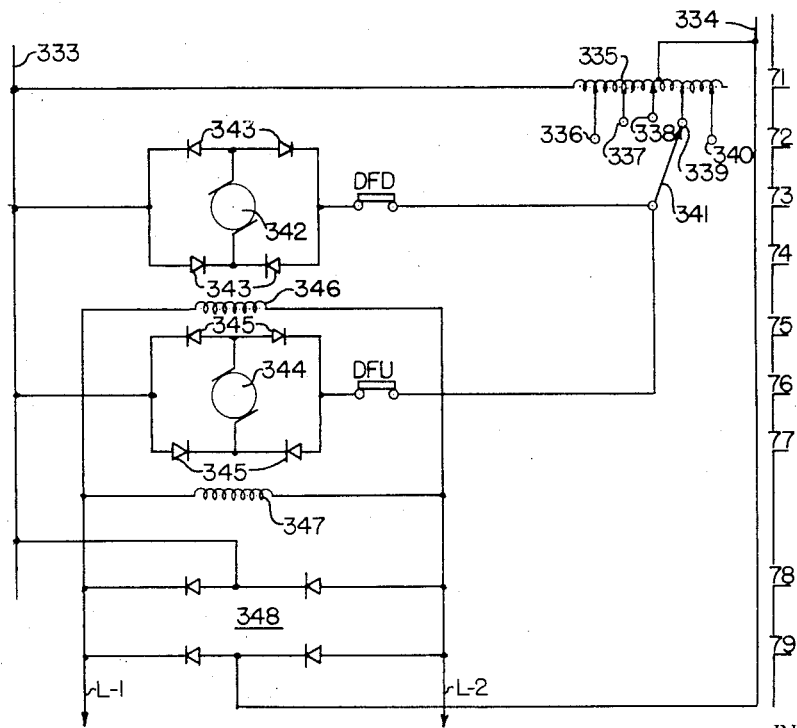
Fig. VI
INVENTOR.
RAYMOND A. BURGY
BY
Marshall, Marshall & Yeasting
ATTORNEYS

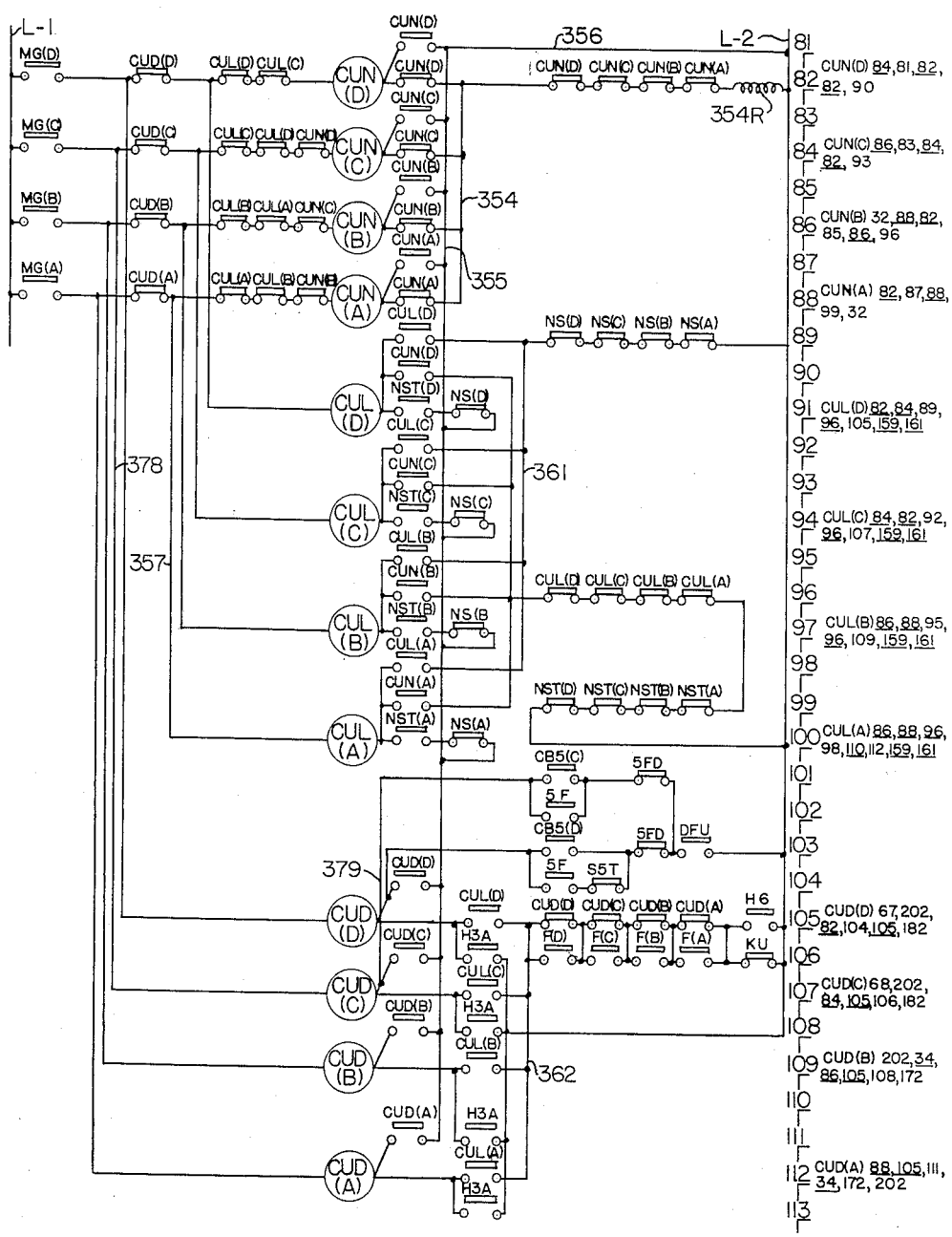
Fig. VII

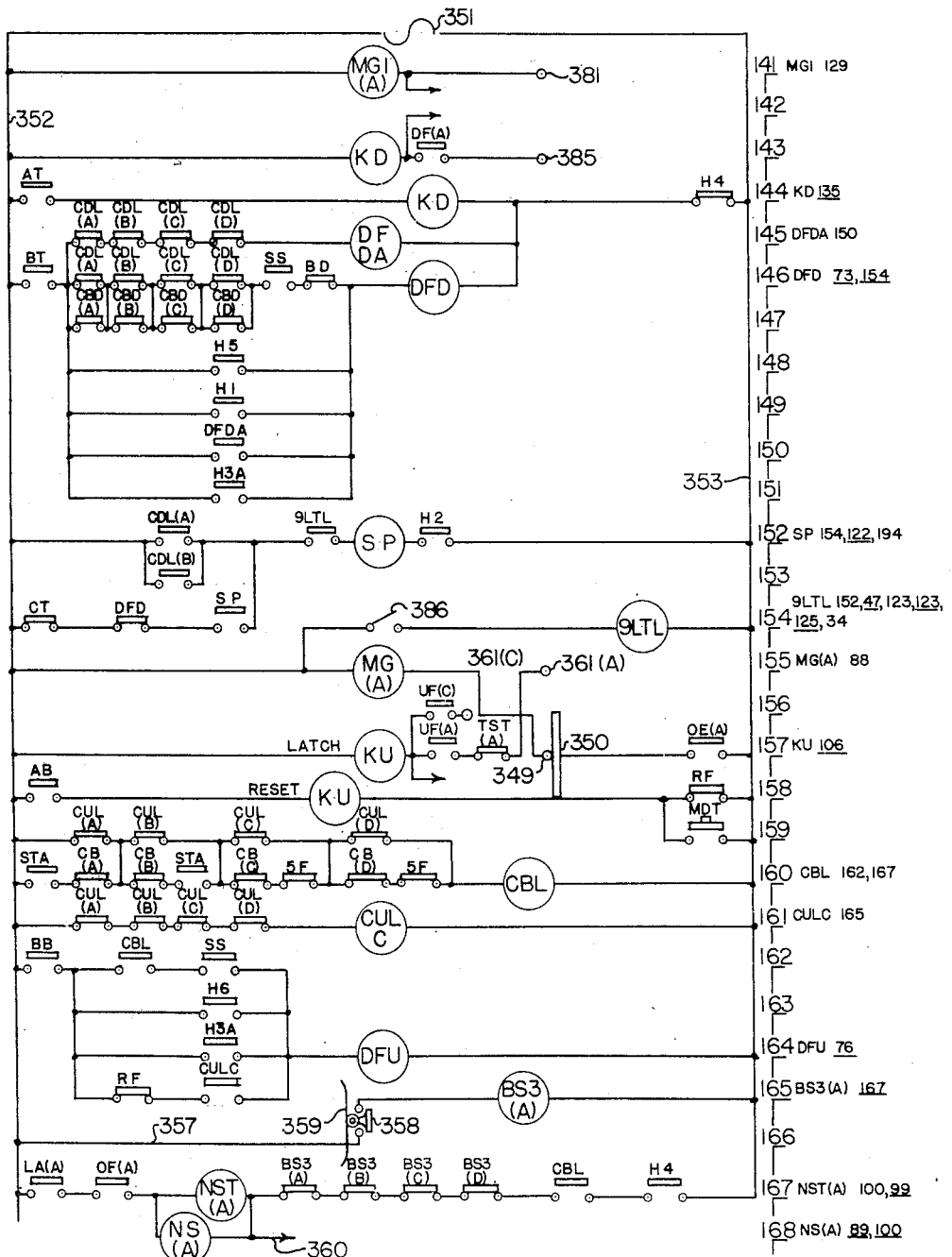
Fig. IX

Nov. 18, 1958
R. A. BURGY
2,860,728
ELEVATOR CONTROLS
Filed Jan. 2, 1957
11 Sheets-Sheet 8
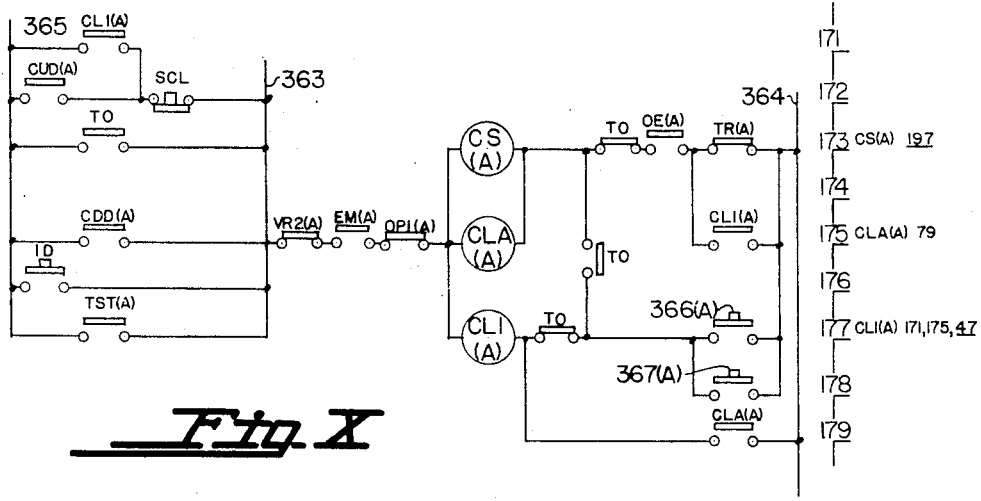
Fig. X
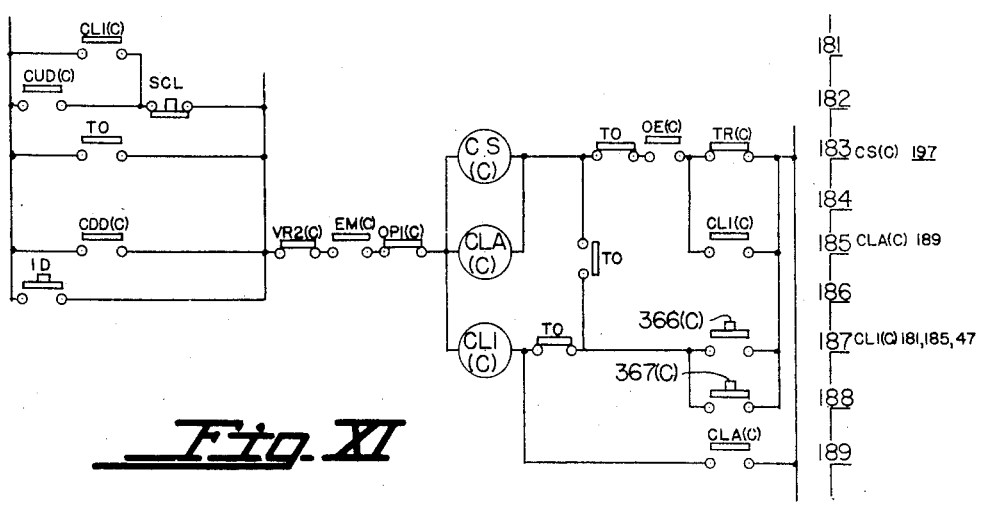
Fig. XI
INVENTOR.
RAYMOND A. BURGY
BY
Marshall, Marshall & Yeasting
ATTORNEYS

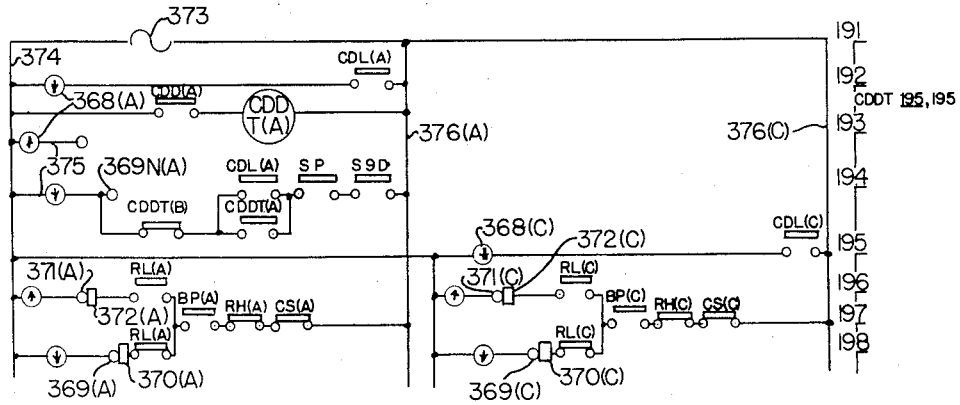
Fig. XII
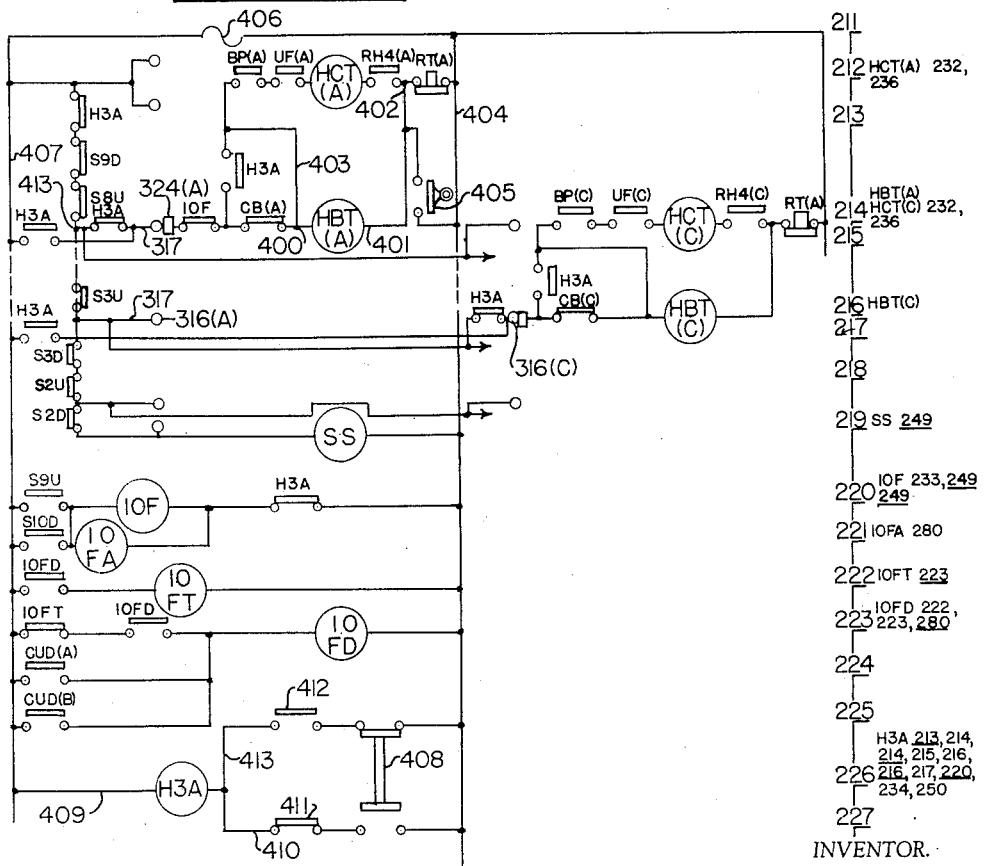
Fig. XIV
INVENTOR.
RAYMOND A. BURGY
BY
Marshall, Marshall & Yeasting
ATTORNEYS

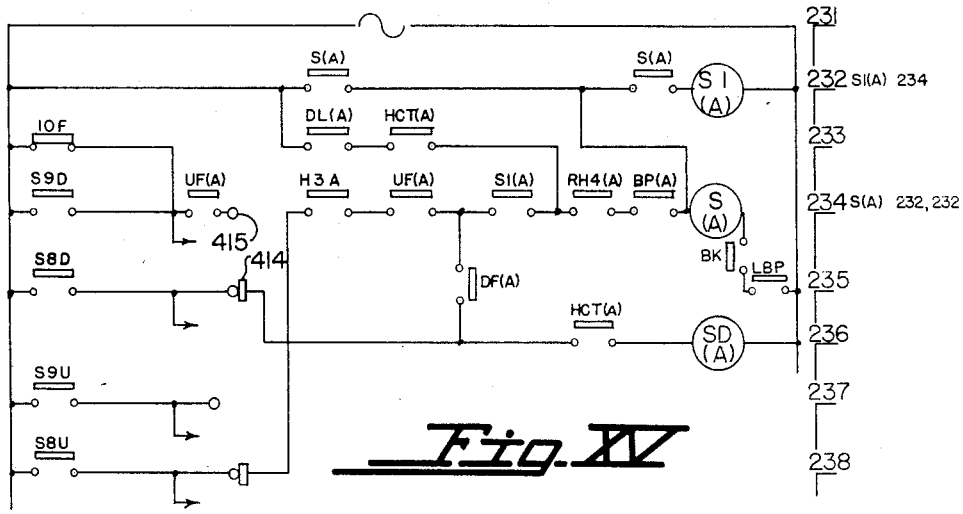
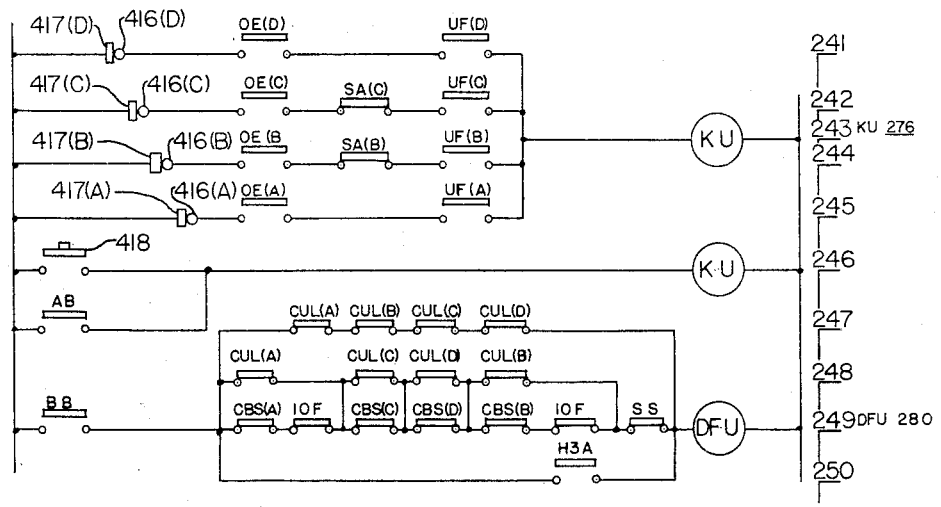

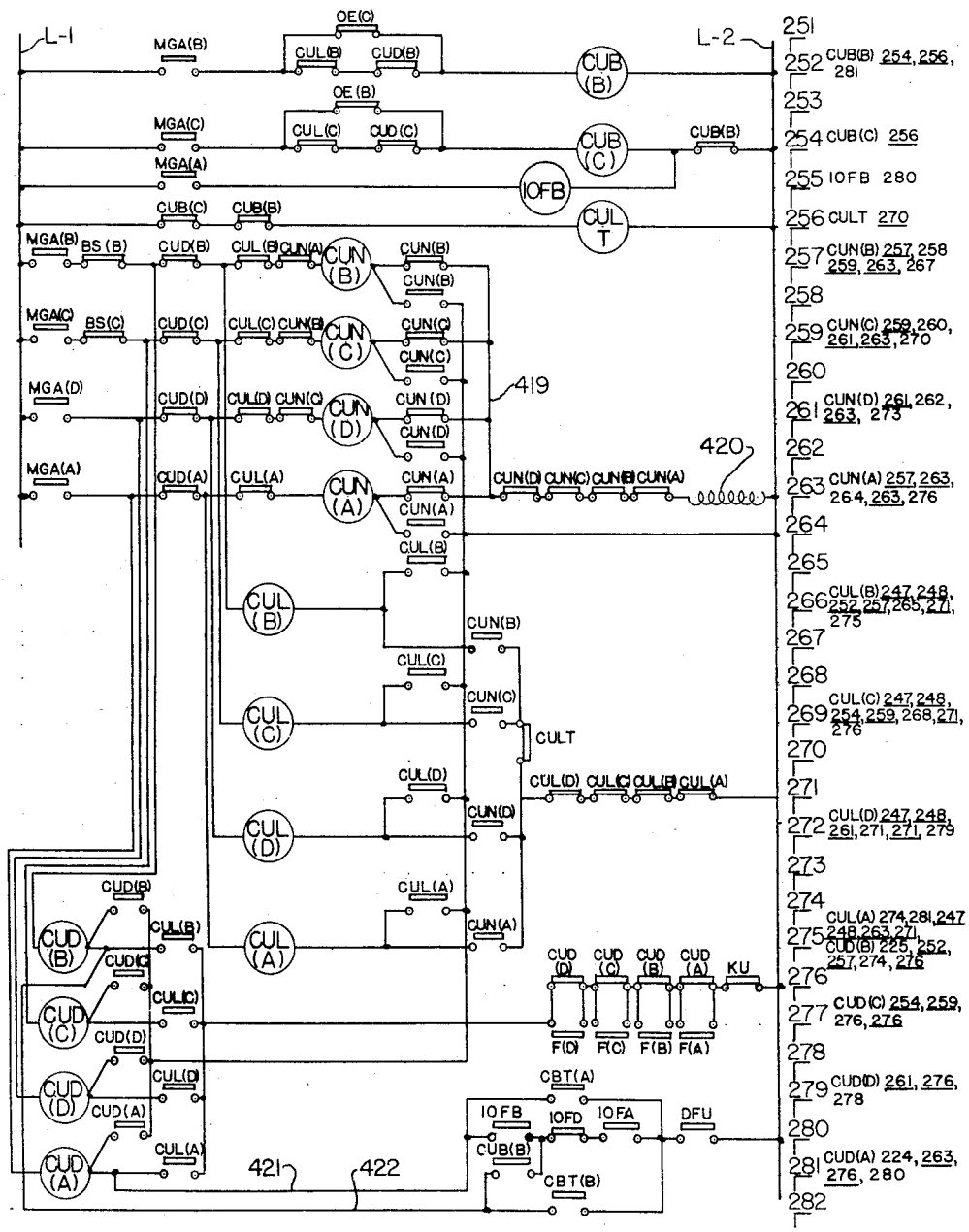
Fig. XVII
INVENTOR.
RAYMOND A. BURGY

United States Patent Office 2,860,728
Patented Nov. 18, 1958

2,860,728

ELEVATOR CONTROLS

Raymond A. Burgy, Maumee, Ohio, assignor to Toledo Scale Corporation, a corporation of Ohio Application January 2, 1957, Serial No. 632,130

36 Claims. (Cl. 187—29)

This invention relates to improved elevator controls and particularly to elevator controls concerned with providing special service to or at predetermined landings.

The objects of the invention are to improve elevator service, to utilize a given number of elevator cars more effectively, to afford preferential service to selected landings, and to alter the dispatch cycle of an elevator system without disrupting the service.

These objects are realized in the several embodiments disclosed herein in a multicar elevator system having certain cars serve landings other than those served by other cars. Dispatching is employed in these systems to either automatically start cars from a terminal landing at intervals or indicate to operators in the cars that they should start their cars. Ordinarily cars at the terminal are dispatched in a preferred order, in the order of arrival or a combination of order of arrival and preferred order. According to this invention the order of dispatching is altered to improve the distribution of service. Thus, cars capable of serving one or more landings which are not served universally are interspersed with cars serving other landings in the preferred dispatching sequence.

Further enhancement of service is realized by accelerating the dispatching of a car capable of serving a landing for which service is desired. A car can be dispatched, if available, immediately upon registration of the service demand. Dispatching patterns are also established in response to service requirements by the current capabilities of the system to satisfy those requirements.

The illustrative embodiments also include means to improve the operating pattern of cars returning to the principal dispatching terminal such as dispatching from landings near the opposite limits of travel or unique reversal controls operated at intermediate floors.

A feature of the invention resides in accelerating the dispatching of a car in response to a requirement for service at a landing which cannot be served by other cars of the system.

Another feature involves means sensing the capacity of the system to respond to calls for service requiring travel of a car to a landing served by less than the entire bank and operating the system to fulfill the requirement expeditiously by maintaining the then current operating pattern or introducing a new pattern as by accelerating dispatching of a selected car.

Another feature involves means insuring the dispatch of an effective car to a floor served by less than all the cars within the current dispatching interval in response to a service requirement for that floor by continuing the dispatching operation if such a car is next to be regularly dispatched and by dispatching such a car if the next car to be regularly dispatched is incapable of providing the service.

Another feature comprises dispatching cars in a single direction from two or more proximate landings while maintaining the appropriate dispatching relationship between the cars.

A further feature resides in arranging car positions and service demand sensing means to insure that cars dispatched from a more remote landing will satisfy those requirements at a less remote dispatching landing thereby utilizing the system more effectively.

An additional feature resides in alternating or otherwise interspersing the dispatching of cars having different service capabilities to improve the distribution of service.

An additional feature includes means to space the dispatch of cars serving limited service landings sufficiently to enable a first car dispatched in response to a call for service at such a landing to respond to and cancel that call before a second car can be dispatched.

A further feature involves means for utilizing cars more effectively wherein a car may be partially shut down yet available for dispatching only when other cars which are in operation are not available. Such means includes apparatus for transferring the operating cars to the available for dispatching status when they return to a position where they can assume that condition, and for causing the partially shut down car to become unavailable for immediate dispatching when the operating cars are available.

A still further improvement in service is realized by selectively introducing simulated extreme calls in controls for individual cars which reverse those cars at extreme calls, e. g. high call reverse circuits, to make cars available for dispatching at dispatching landings more frequently.

The above and additional objects and features of this invention will be appreciated more fully from the following detailed description when read with reference to the accompanying drawings wherein:

Fig. I is a diagram of an elevator system typical of the type to which this invention is applicable;

Fig. II is an across the line diagram of a car signal circuit for two typical cars serving different floors in a single elevator system embodying this invention;

Fig. III is a fragmentary across the line diagram of the landing signal registration and reset circuits of the cars of Fig. II;

Fig. IV is an across the line diagram of a circuit for sensing the highest call and for establishing the circuits for special service in response to landing calls at floors served only by selected cars as can be combined with Fig. II is an elevator system depicting the invention;

Fig. V is a simplified schematic diagram of one of the dispatching machines that is arranged to give dispatching signals to the elevators;

Fig. VI is an across the line diagram of the power supply circuits for the dispatching machine motors;

Figs. VII and VIII are across the line diagrams of a typical selection and dispatching circuits for up and down dispatching respectively, each circuit embodying certain features of this invention;

Fig. IX is an across the line diagram of dispatch timer motor controls and dispatch signal circuits suitable for combination with the illustrative elevator system;

Figs. X and XI are across the line diagrams of the car starting circuits for the cars having the circuits of Figs. II and IV;

Fig. XII is a fragment of a landing signal circuit in across the line form;

Fig. XIII shows a portion of the starter's and operators's indication circuits in across the line form;

Fig. XIV is an across the line diagram of landing signal higest call circuits, special service landing circuits and operating program selection circuits for another embodiment of this invention;

Fig. XV is an across the line circuit of a fragment of the landing signal stopping circuits for the embodiment of Fig. XIV;

Fig. XVI is an across the line diagram of the dispatch timer motor control circuit and the dispatch signal reset circuit for the system of Figs. XIV and XV; and Fig. XVII is the selection and dispatching circuit for the system of Figs. XIV, XV and XVI in across the line form.

The two elevator systems in which the several features of this invention are illustrated have been employed as examples of the manner of combining this invention with existing equipment and, therefore, should not be read as limiting the invention. Since much of those systems is well known, their disclosure has been restricted greatly in an attempt to show only those elements which cooperate directly in the new combinations constituting this invention. This restriction in the disclosure has been utilized to emphasize the invention and avoid confusion with the prior art. In practice an elevator system might have many other features, either known or new, combined with this invention to advantage.

Specific forms of controls which have been employed in cooperation with the invention are shown. These controls, including the car selection, car dispatching, call registering, and timing means, have numerous alternatives in the art; hence, the substitution of these alternatives is contemplated in the practice of the invention.

A large number of circuits are shown. In order to facilitate an understanding of the relationship between actuating means, ordinarily relay coils represented as circles embracing reference characters, and the actuated means, ordinarily contacts identified by adjacent reference characters corresponding to those assigned to the respective actuating means, a marginal key has been provided. In this key the position of elements in horizontal alignment therewith has been signified by a line number appearing in the column immediately to the right of the circuit. The center column of the key lists the operating coils which are located in a given line or zone adjacent that line in the circuit. These coils are indicated by their reference characters which are positioned in the column in alignment with their position in the circuit. The line location of contacts actuated by a coil are listed in the right-hand column of the key adjacent the reference character for the coil. Back contacts, those closed when the coil is denergized and opened when it is energized, are differentiated from front contacts, those normally open and closed by energizing their actuating coil, by underlining the numeral indicating the line in which they appear. All elements in the circuits are shown in the condition they assume when their actuating coils are deenergized although it should be recognized that some contacts are displaced to their energized position throughout all or most of the operating interval of the system.

The general construction of and service provided by the two elevator systems illustrated is similar. Each consists of a bank of four cars A, B, C and D serving a building having nine landings above a first or dispatching landing. Cars A and B are arranged to travel from the first or dispatching landing to the tenth while cars C and D can travel from the first to the ninth landing. In the first embodiment the fifth landing is served only by cars C and D, thus, illustrating the application of the service variations provided for landings served by less than all the cars of the bank to intermediate landings as well as landings at the extremes of travel. Each landing is equipped with landing signal registering means such as hall buttons 21 individually identified as 1U through 9U for up landing calls from the first through ninth landings and 2D through 10D for down landing calls from the second through tenth landings. Each button 21 is operatively connected to the mechanism that controls movement of cars A, B, C and D. Elements of that mechanism which are individual to the cars, when duplicated in this disclosure, will be identified with their respective car by a reference character having the letter suffix of that car in parenthesis.

As schematically represented, each car is supported by a cable 22 trained over a drive pulley 23 and connected to a counterweight 24. The drive pulleys 23 are mounted on armature shafts 25 of elevator drive motors 26. The shafts are operatively connected both mechanically and electrically to controller mechanism 27. The controller is actuated by the car calls, position, loading, and timing of its respective car, the landing signals, master signals from a master controller for the bank, and the relationships between the several cars of the bank.

One portion of the controller which is referred to below is the floor selector machine. This machine can be in any of several well known forms, for present purposes consider it as an array of contacts and cam actuated switches arranged in rows and lanes combined with a crosshead or carriage supporting cams for actuating the switches and brushes engaging the contacts. The contacts in the circuits operating while a car is in a given position are arranged in rows paralleling the carriage and those contacts in similar circuits for different car positions are in lanes paralleling the direction of travel of the carriage. Typical functions of the contacts are up and down landing signal operations, up and down reset of the landing signals, operation of the hall lanterns, car position indications, and car signal stopping circuits. Thus, the rows in the array of contacts of the floor selector correspond with respect to the carriage as the landings correspond to the car position. This correspondence is utilized by driving the carriage along the lanes in the array so that it corresponds to the actual or effective position of the elevator car whereby the circuits connected to the contacts are completed through brushes on the carriage and switches are opened by the cams in the proper synchronism with car travel.

In its simplest form the carriage of the floor selector can be driven directly as a function of car motion through gearing and a slippable connection which enables it to be maintained in synchronism with car position. In another well known form the carriage is driven by an essentially constant speed motor which is operative whenever the elevator car is set for motion thereby moving the carriage to the effective car position to the extent that the car cannot respond to circuits the contacts of which have been passed by the carriage. In the latter form the carriage stops at a contact row corresponding to a landing which requires service and the car is decelerated in approaching that landing.

Details of the system will now be considered. It is to be emphasized that much of the circuitry shown is duplicated. In Figs. II and IV, for example, the switches and contacts for floors seven and eight have been eliminated as have the circuits for car B, corresponding to those for car A, and car D, corresponding to those for car C. Similarly, Fig. III shows the landing signal reset circuits for the ninth and tenth landings of cars A and C although similar circuits exist for landings one through four and six through ten for both cars A and B while cars C and D have these circuits for floors one through nine. While elevator systems are often provided with at least one car which serves landings beyond the dispatching terminal or terminals, the first embodiment contains no disclosure of controls suitable for such service and the second embodiment shows only certain details of the dispatching features of such controls. The landing signal circuits of Fig. XII have been illustrated for the eighth, ninth and tenth landings for cars A and C although other landings have controls similar to those for the eighth landing and cars B and D have circuits corresponding to those for cars A and C respectively.

The second embodiment of a system has been disclosed in even more abbreviated form since many of its circuits correspond to those of the first embodiment. Fig. XIV shows only a few of the landings for cars A and C to illustrate the highest call circuits and their operation. While the basement service is provided below the terminal from which cars are normally dispatched upward the means for registering demands for that service are so similar to those shown that such means have not been illustrated.

In order to facilitate the reading of the circuit description which follows the various relays and relay contacts will be identified and listed according to the alphabetical order of their reference characters. Those elements which are duplicated for all cars or cars having common functions such as cars A and B or C and D are listed for each car even though they may appear only once in the drawings. The relay for which both contacts and actuating coils appear in the first embodiment shown in Figs. II through XIII include:

| | |
|---|---|
| BS3(A) to (D) | Car position indicating relay. |
| CB(A) to (D) | Car signal above relay. |
| CBA(A) to (D) | Auxiliary car signal above relay. |
| CBL | On call dispatch control relay. |
| CBT(A) and (B) | Tenth landing car signal relay. |
| CB5(C) and (D) | Fifth landing car signal relay. |
| CDD(A) to (D) | Down dispatch relay. |
| CDL(A) to (D) | Down load relay. |
| CDT | Minimum time top dispatching relay. |
| CDDT(A) and (B) | Down dispatch timer relay. |
| CLA(A) to (D) | Door closing relay. |
| CL1(A) to (D) | Door closing relay. |
| CS(A) to (D) | Car starting relay. |
| CUD(A) to (D) | Up dispatch relay. |
| CUL(A) to (D) | Up load relay. |
| CULC | Auxiliary up car selection relay. |
| CUN(A) to (D) | Up next car relay. |
| DFD | Down dispatch timer holding relay. |
| DFDA | Auxiliary down dispatch timer holding relay. |
| DFU | Up dispatch timer holding relay. |
| HBT(A) to (D) | Highest call relay. |
| HCT(A) to (D) | Highest call relay. |
| KD | Down scheduling relay. |
| KU | Up scheduling relay. |
| MG(A) to (D) | Up dispatching landing relay. |
| MG1(A) to (D) | Down dispatching landing relay. |
| NS(A) to (D) | Night selection relay. |
| NST(A) to (D) | Night selection timer relay. |
| S2D to S10D | Second down landing signal relay to tenth down landing signal relay. |
| SP | Service indication relay. |
| SS | Landing call indication relay. |
| S5T | Fifth landing dispatching timer relay. |
| STA | Tenth landing signal auxiliary relay. |
| S1U to S9U | First up landing signal relay to ninth up landing signal relay. |
| TST(A) and (B) | Tenth landing starting time relay. |
| 5D | Auxiliary fifth down landing signal relay. |
| 5F | Auxiliary fifth landing signal relay. |
| 5FD | Fifth landing dispatching relay. |
| 5FT | Fifth landing dispatching timer relay. |
| 5U | Auxiliary fifth up landing signal relay. |
| 9LTL | Ninth landing terminal limiting relay. |

The contacts, relay actuated, manual, and cam operated which are shown in Figs. II to XIII include:

| | |
|---|---|
| AB | Bottom dispatching contact. |
| AT | Top dispatching timer cam operated contact. |
| BB | Bottom dispatching contact. |
| BD | Down three-car relay. |
| BP(A) to (D) | By-pass relay. |
| BT | Top dispatching contact. |
| C2 to C4(A) to (D) | Car buttons. |
| C5(C) and (D) | Car buttons. |
| C6 to C9(A) to (D) | Car buttons. |
| C10(A) and (B) | Car buttons. |
| CBD(A) to (D) | Car signal below relay. |
| CT | Top dispatching contact. |
| DF(A) to (D) | Down generator field relay. |
| DL(A) to (D) | Down signal direction relay. |
| F(A) to (D) | Dispatch failure relay. |
| EM(A) to (D) | Emergency relay. |
| G(A) to (D) | Gate relay. |
| H1 | Up peak program relay. |
| H2 | Off peak program relay. |
| H3 | Down peak program relay. |
| H3A | Down peak service throwover switch. |
| H4 | Off hours program relay. |
| H5 | Heavy up program relay. |
| H6 | Heavy down program relay. |
| ID | Instant dispatch relay. |
| LA(A) to (D) | Leveling acceleration relay. |
| LCR(A) to (D) | Late car reversal relay. |
| LP2(A) to (D) | Protective relay. |
| MDT | Manual dispatch button. |
| OE(A) to (D) | Car in service relay. |
| OP1(A) to (D) | Door opening relay. |
| RF | Down dispatcher reset relay. |
| RH3(A) to (D) | Rheostat relay. |
| RL | Direction throw-over relay. |
| SCL | Starter's control button. |
| TO | Attendant operation throw-over switch. |
| TR(A) to (D) | Start time relay. |
| UF(A) to (D) | Up generator field relay. |
| UL(A) to (D) | Up signal direction relay. |
| VR2(A) to (D) | Advance motor stopping relay. |
| 1U to 9U | Up landing buttons. |
| 2D to 10D | Down landing buttons. |
| 5FA | Key operated fifth landing lock out contact. |
| 2L to 4L(A) to (D) | |
| 5L(C) and (D) | Cam operated floor selector machine landing contacts. |
| 6L to 9L(A) to (D) | |
| 10L(A) and (B) | |

Car calls and their position with respect to the car are sensed in the circuit of Fig. II. A source of alternating current 301 supplies leads 302 and 303 feeding a family 304 of serially connected cam operated landing switches 2L through 4L and 6L through 10L on the floor selector machine of cars A and B and 2L through 9L for cars C and D. Car A is shown at the third landing hence cam 305(A) is shown holding contacts 2L(A) and 3L(A) open while car C is at the fifth floor and has contacts 4L(C) and 5L(C) held open by cam 305(C). Contact family 304 is connected to line 392 through the back contacts DL at line 22 of a down signal direction relay (not shown) and the actuating coils of car signal above relays CB and CBA. Relays CB and CBA are energized through family 304 by means of a tap 306 extending from the family below each switch to car signal contacts C2 through CBT for a landing corresponding to that switch and thence to lead 303. Thus, as long as no call for service above the car is registered in the car by closing one of the car signal contacts relays, CB and CBA are deenergized. Closure of contacts connected to an active portion of the family of switches 304 completes the circuit and energizes CB and CBA. Only that portion of the family 304 above the car is active, however, since the upper end of cam 305 corresponds to the effective car position so that as the car proceeds upward it successively opens higher landing switches leaving a smaller portion of the family active. In this manner the energization of CB and CBA signify the registration of a car call for a landing above the current effective car position and these relays are deenergized as the car reaches the landing of its highest call.

Most of the car signal contacts in circuit with taps 306 are shown actuated by push buttons, however, those contacts for the tenth landing CBT at line 24 and the fifth landing CB5 at line 27 are relay actuated. These contacts are arranged in this manner inasmuch as a number of other circuits for the respective cars must be actuated in response to a call for service to their landings and the usual electromagnetic latched push buttons would be inadequate to control the requisite number of contacts. Accordingly, the push buttons for the landings served by less than all the cars are shown in line 31 as C10 for car A actuating top landing car button relay CBT and as C5 for car C actuating fifth landing car button relay CB5. These relays when energized close front contacts CBT and CB5 in circuit with appropriate taps 306 to function as the above described button controlled contacts.

The energization and functions of top landing starting time relay TST will be described below. In general it is energized when the car is the only one available to serve the top landing and a demand for top landing service is registered. Its operation issues a dispatch signal to the car and prevents the disruption of the dispatching sequence for the remaining cars in the system whereby the tenth floor is given preferential service.

Detailed discussion of the functions of fifth landing car button relay CB5 will also be deferred. It may be noted that it operates when contacts 5FA, a key operated contact, arranged to be mechanically locked out when it is desired to bar access to the fifth landing, are opened and otherwise is energized by the operation of the fifth landing car button. When energized, relay CB5 issues a dispatch signal to the car if no other demand for service is registered and the next car to be dispatched is incapable of serving the fifth floor, and if a fifth floor serving car has not been dispatched within a predetermined interval preceding the call. While the following discussion considers accelerated dispatching from the lower terminal only in response to a fifth floor call, it is to be appreciated that similar circuits might be set up for upper terminal dispatching if deemed warranted.

Landing call registering and resetting circuits are shown in Fig. III for the ninth and tenth floors. These circuits are energized by alternating current from source 307 through leads 308 and 309 by closing push buttons 21 at the landings. Each of the landing signal relays is provided with two coils bearing the same reference characters. Closure of a landing signal button, as 10D, momentarily closure of a landing signal button, as 10, mementarily energizes upper coil S10D of the down landing signal relay for the tenth floor to latch that relay in its energized position. Reset of the latched relay is accomplished by energizing its lower coil S10D momentarily upon the arrival of the crosshead of the floor selector at a point positioning brush 310 on contact 311 of the floor selector while the car is set for downward motion as indicated by the closure of contact DL. All cars capable of serving a landing have contacts on their floor selector connected in parallel with the reset contacts of their corresponding cars so that any car serving the landing will effect the reset of the signal thereby interrupting the registration of the demand for service on the other cars. These and other similar parallel connections are represented in this and subsequent figures by means of the arrow-tipped branch leads. Thus, branch lead 313 extends from S10D to contact 311(B) (not shown) of car B, the only car other than A serving the tenth landing. Branch 314 extends from S9D to reset contacts for the ninth landing down signal reset contacts on the floor selectors of cars B, C, and D since all cars serve downward calls from this landing. When car A or B arrives at the tenth floor, it is set for downward travel by opening contacts UL at line 45 of the up signal direction relay (not shown) to disable the up landing signal reset brush 312 during the downward travel of the car and by closing down signal direction relay DL at line 47 to enable a circuit through the other contacts in that line. Brush 310 is connected to source 307 by lead 309 and advance motor stopping relay contacts VR2 of line 48, energized when the car is set to move and the carriage of the floor selector is being driven by the advance motor, or door close relay contacts CL1 of line 47, opened when the door is closing by its actuating coil in Fig. VIII and otherwise closed, and gate relay contacts G of line 47, which are closed except while the gate is open, and the remainder of the contacts in line 47. Thus, the additional conditions necessary to reset S10D include the absence of a malfunction such as would deenergize normally energized protective relay LP2 (not shown) and open contacts LP2, or the imposition of a by-pass signal on the car, deenergizing normally energized by-pass relay BP (not shown) to open contacts BP.

The circuit of Fig. III is quite conventional and is shown to lend continuity to the disclosure and incidentally to illustrate the parallel connection of the reset contacts for the several cars enabling those cars which do not serve certain landings to be operated from a single set of landing signal relays by eliminating the connections from the relays or other controls for those certain landings to the floor selector machine contacts corresponding to that landing for that car.

The several landing signal relays S1U through S9U for upward travel and S10D through S2D for downward travel actuate a number of contacts in Fig. IV to contribute to the operation of highest call mechanisms and mechanisms which alter the dispatching operations to institute the service of cars to the floors served by less than the entire bank of elevators. The circuit for car A shown on the left side of the drawing is in general conventional. It includes a serially connected family 315 of the up and down landing signal relay contacts for the landings served by cars A and B connected to floor selector machine contacts 316 positioned in correspondence to the landing locations by means of taps 317 and connected to similar contacts in parallel therewith by means of the arrow-tipped branch leads 318. Certain of the taps 317 are also connected by means of leads 319 to floor selector contacts of car C and to car D by their arrow-tipped branch leads 320.

As in the car signal circuits of Fig. II, the highest call circuit is energized through a portion of a series family of normally closed landing call relay contacts for landings above the current position of the car. When the circuits are energized and the car is set for high call operation it reverses and is returned to the lower terminal in the usual arrangement. Source 321 supplies leads 322 and 323 of the highest call circuit. Lead 322 is connected through the contact family 315 to the several floor selector contacts 316 in the highest call lanes of contacts. The circuit is completed through that portion of the family above the highest landing call. If no landing calls are registered, the circuit is completed through landing call indication relay SS at line 59 to lead 323(A), energizing that relay to establish conditions signifying an absence of such calls. If no landing call is registered above the current position of the car, as represented by the location of floor selector brush 324 of the high call circuit, that brush is energized and, if other conditions are met, the highest call circuits operate. Circuits of this nature are shown for example in E. B. Thurston's application Serial No. 447,801 entitled "Late Car Dispatching from High Call" filed August 4, 1954. Highest call relays HCT and HBT are energized if no landing calls are registered above the car and back contacts CBA of the car signal above relay are closed at lines 56 and 58 to indicate an absence of car calls above the cars if the elevator system is not set for down peak or off peak operation as signified by the open back contacts H3A and H2 respectively at lines 56 and 58. They are also energized if the system has been set for late car reversal operation by the closure of contacts LCR at lines 55 and 57 as described in the above noted Thurston application and, as regards relay HCT, only if the remainder of the contacts in lines 57 for car A and 55 and 56 for car C are closed. These contacts will be closed on conventional trips upward since the by-pass relay (not shown) is normally energized unless the car is set to by-pass signals, thereby holding contacts BP closed, rheostat contacts RH3 are closed while the car is in motion as are advance motor stopping relay contacts VR2, and up field relay contacts UF2 are closed while the car is set to run upward. The above portions of the high call circuit follow prior teachings. However, this circuit has required modification to lend it to operation where certain floors are served by less than all the cars.

The series contact family 315 is provided with contacts from the up and down landing signal relays for those landings served by all cars of the system since all cars function from this series by the parallel tap connections outlined above. The highest call circuits of cars A and B must be arranged to sense up calls at the ninth landing and down calls at the tenth landing without having those calls affect the highest call circuits of cars C and D. Up and down landing calls from the fifth landing must actuate the circuits of cars C and D without affecting those of cars A and B. Thus, the registration of a ninth landing up or a tenth landing down call is made effective in the highest call circuits of cars A and B by causing such calls to open contacts S9U and S10D respectively at line 69 thereby deenergizing top landing service relay STA to open its contacts STA between brushes 324(A) and 324(B) and their respective highest call relays HCT and HBT.

As shown in the highest call circuit for car C on the right side of Fig. IV, the landing signal relay contacts for an intermediate floor served by less than all the cars also requires the insertion of those contacts in the portion of the circuits individual to the cars capable of responding. In this instance the insertion has been effected by including the fifth floor contacts in series between the brushes 324(C) and (D) and their respective highest call relays, HCT(C) and HBT(C), and HCT(D) and HBT(D), while the car is below those contacts, and bypassing those contacts when the car is above them. A down landing call at the fifth landing closes contacts S5D at line 65 to energize relay 5D. Relay 5D opens back contacts 5D at line 56 in the highest call circuits, opens back contact 5D at line 60 to interrupt the energization of slow drop out relay S5T, and closes contacts 5D at line 63 to energize relay 5F. Similarly, an up call at the fifth landing closes contacts S5U at line 64, energizing relay 5U which opens contacts 5U at line 56 and 69 and closes contacts 5U at line 61.

When cars C or D are below the fifth landing, their brushes 324 engage their floor selector machine contacts 316 at line 56 or below and their highest call circuits are energized through the portion of contact family 315 above line 56, taps 317, lead 319, floor selector brush 316, contacts 5U and 5D and the contacts discussed above with regard to the highest call circuit for car A. When the floor selector carriages move brushes 324 of these cars to the fifth landing, down calls at that landing should no longer influence the highest call circuits. Therefore, contacts 5D are shunted by a second highest call floor selector brush 325 which engages the lowest contact 326 of a series of floor selector contacts 329 at this time. Contact 326 is connected to the junction point 327 between the fifth up and fifth down relay contacts 5U and 5D and brush 325 is connected to junction point 328 between contacts 5D and CBA to by-pass contacts 5D. Thus, the highest call circuits are responsive to landing calls from the down ninth landing call to the up fifth landing call while the car is at the fifth landing.

As the car proceeds above the fifth landing, the up fifth landing calls are also rendered ineffective as regards the highest call circuits by means of brush 325 which has been moved to contacts 329 in lane with contact 326. Each landing above the fifth has a contact 329 positioned to be engaged by brush 325 which brush 324 engages contact 316 for that landing. All of contacts 329 are connected in series to junction point 330 between brush 324 and contact 5U. Highest call circuits are energized through the portion of contact family 315 for landing calls requiring service above the car through a lead 319, a contact 316, brush 324, junction 330 to contacts 329, brush 325, junction 328 and the circuits discussed above, when cars C or D proceed above their fifth landings.

The remaining operations and functions of the circuits at line 60 and below in Fig. IV will be discussed below particularly with respect to the car selection and dispatching circuits.

A timer establishing the intervals between cars departing upward or downward is schematically represented in Fig. V. A portion of an actuating circuit for two such timers is shown in Fig. VI. Each timer comprises a direct current drive motor 329 which is connected through a gear reduction box 330 to drive a cam disk 331. The cam disk 331 has a projection 332 which, as it moves or rotates clockwise, first closes a set of contacts B then a short time later closes a set of contacts A and one half a revolution later opens a set of contacts C. The drive motor is energized by a variable voltage direct current at a speed characteristic of the applied voltage to provide variations in the timing interval.

Fig. VI shows the circuits for energizing the motors that drive the timing mechanism connected with the equipment for dispatching cars upward and downward. In the circuit as shown, alternating current is supplied from leads 333 and 334 to autotransformer 335 having a plurality of taps 336, 337, 338, 339 and 340 which are at different voltages. The speed of the motors is selected by connecting rectifier bridges between an appropriate tap and lead 333 by means of selector switch 341 and thence through contacts DFD of a down dispatch timer holding relay shown at line 146 of Fig. IX and through contacts DFU of an up dispatch timer holding relay shown at line 164 of Fig. IX. The armature 342 of the down dispatch timer motor is connected across rectifiers 343 connected as a bridge between contact DFU and lead 333 while the up dispatch timer motor armature 344 is similarly connected in a bridge of rectifiers 345. Fields 346 and 347 for armatures 342 and 344 respectively are energized from a full wave rectifier bridge 348 connected between leads 333 and 334. Contacts DFD, line 73, and DFU, line 76, remain closed at all times except when there are no cars available for dispatching in the appropriate direction or other conditions dictate to the contrary. If no car is available near the end of a dispatching interval then the dispatching motor for that direction is stopped until a car arrives at a dispatching landing and is available for dispatching.

The arrival of a car at the bottom dispatching terminal is indicated by the engagement of a floor selector contact 349 in Fig. IX by brush 350 to energize relay MG at line 155 from source 351 through lead 352, coil MG, contact 349, brush 350, closed contacts OE(A) of an in-service relay (not shown) which is energized while the car is conditioned for service, to lead 353 and thence to source 351. Relay MG closes its contacts at lines 82, 84, 86 or 88 of Fig. VII to signify that its respective car is available to be selected for dispatching. If no other car is present at the lower terminal the up next relay CUN for that car, assume car A, at line 88 is energized from lead L-1 which with lead L-2 is connected to bridge 348 of Fig. VI to supply Fig. VII circuits with direct current. The energizing path for CUN(A) from lead L-1 to L-2 is through contacts MG(A), back contacts CUD(A) of the up dispatch relay, back contacts CUL(A) and CUL(B) of the up load relays for cars A and B, back contacts CUN(B) of the up next car relay for car B, coil CUN(A), back contact CUN(A), lead 354 to the up next car relay series chain of back contacts at line 82 and through a reactance coil 354R. As relay CUN(A) pulls in, its CUN(A) contact at line 87 closes to connect the right terminal of the coil to Line L-2 through leads 355 and 356 prior to the opening of back contacts CUN(A) at lines 88 and 82, thereby, insuring that the relay remains energized. The opening of CUN(A) at line 82 bars the selection of another car upon its arrival at the bottom terminal.

A selection preference is established for the cars when more than one is available at the terminal by means of reactance coil 354R which permits the current level to build up gradually in the parallel up next car relay circuits. The up next car relays CUN(A) through (D) require successively higher currents in an inverse order to pull them in. Thus, if all cars were present at the first landing relay CUN(D) would pull in first thereby locking out all others by opening its back contacts at line 82. To further insure the lock out of relay CUN(C), requiring the next lowest current level, during the build up of pull in current, relay CUN(D) has back contacts at line 84 which break the energizing circuit for CUN(C). Similarly, lock out circuits for relay CUN(B) by relay CUN(C) and by CUN(B) for CUN(A) are also provided.

The up load relay CUL(A) for car A is energized by the closing of contact CUN(A) at line 99, if not other car has been assigned as a load car or if another car is assigned, when that car is released. Sensing of the assignment of a car is effected in the series of up load relay back contacts CUL(A) through CUL(D) in line 96 which must be closed to complete the circuit for relay CUL(A) from L–1 through MG(A) and CUD(A) at line 88, lead 357, coil CUL(A), closed contact CUN(A) at line 99, the CUL family of contacts at line 96, and the family of night selection timer relay back contacts NST(A) to NST(D) of line 99 which are closed except under certain conditions when the system is set for reduced service. When CUL(A) pulls in, its front contacts at line 98 close before its back contacts at line 96 open to maintain it energized. The opening of contact CUL(A) in line 86 prevents car B from being selected as the next load car until car A has been released from its load assignment, thereby establishing a preference for the selection of cars C or D as the next load car so that cars able to serve the tenth and fifth floors are alternately selected by the pull in of their CUN relays while the preceding car holds the load assignment. Contacts CUL(A) in line 88 are opened to avoid the operation of relay CUN(A) while car A remains at the bottom dispatching terminal. Contacts CUL(A) at line 96, when opened, prevent the assignment of another load car until car A is released from its assignment by breaking the circuit from any next car selection contact CUN in a load relay circuit. Contacts CUL(A) at line 98 maintain the load assignment until it is canceled by the night selection operation of contacts NS at line 89 or a dispatch signal is given the car by opening contacts CUD(A) of line 88 for the up dispatch relay.

The assignment of a car to the load condition performs a number of other functions including the operation of signals to indicate that it is the next car to be placed in use at the terminal (by means not shown) and to condition the dispatching circuits. Thus, CUL(A) contacts are opened at lines 159 and 161 of Fig. IX in the energizing circuits for the on call dispatching control relay CBL and the auxiliary up load car relay CULC. Relay CBL is maintained energized unless a call which is unique to the load car is registered, e. g. a car call or a call for a landing which is not served by other cars of the system, by means of the parallel paths of the CUL contacts and those contacts responsive to the unique calls. Car A, for example, when the load car, has its CUL(A) contacts at line 159 open and the energizing circuit for CBL is broken if a car call is registered therein to energize relay CB(A) at line 22 opening contacts CB(A) at line 160 or a landing call for service upward from the ninth landing or downward from the tenth is registered to deenergize relay STA at line 60 permitting contact STA at line 160 to open. Similarly, the cars serving the fifth landing, cars C and D, when subject to a load assignment are responsive to both car calls and fifth landing up and down calls through the energization of relay 5F at line 62 upon the closure of either contacts 5U at line 61 or 5D at line 63 thereby opening back contacts 5F in line 160. Opening of the load relay contacts in line 161 to denergize relay CULC opens contacts at line 165 to deenergize the dispatch timer holding relay DFU to be discussed below.

The night selection feature in the load car assignment circuit is advantageously utilized in a system provided with means for partially or completely shutting-down cars as the demands for service diminish below predetermined levels. Motor-generator set shut-down is provided here by means (not shown) which enable a car to be selected and assigned as the load car while its motor-generator set is inoperative. In such a situation it is desirable to fulfill the requirements of service, if possible, without starting up additional motor-generator sets. This is avoided where unnecessary by the night selection circuits.

As shown in Fig. IX at lines 165 and 166 car position indicating relay BS3 for each car of the system is arranged to be energized through lead 352, lead 357, cam operated floor selector machine contacts 358 and lead 353. Cam 359 is arranged to open the contacts 358 when the car descends below the second landing and to maintain them open while it is below that landing. At all car positions above the second landing the BS3 relay for the car is energized. A series family of back contacts for the BS3 relays of cars A through D are serially connected at line 167 with on call dispatch control relay contacts CBL, of a relay at line 160 which is energized when the load car is subjected to no car calls or other calls which another car might be incapable of serving, as a call for service at the tenth landing for cars A and B or at the fifth landing for cars C and D. This circuit also requires that contacts H4 of an off-hours program relay be closed, H4 being energized at times of reduced service as by a selector switch controlled by the demand for service, a timer, or manually, to provide a connection to lead 353 which is common to all night selection relays NS and night selection timer relays NST. In the drawing only the relays of car A are shown, however, the other cars B, C, and D, are connected from lead 352 in the manner of those for car A and thence to lead 353 as represented by the arrow-tipped branch lead 360. Each pair of these relays is connected in parallel to line 352 through an in-service relay contact OE and a leveling acceleration relay LA individual to that car so that that portion of the circuit is completed if the car is in service and is in the process of leveling at the floor but is opened when the car is stopped at the floor or in motion but not leveling. Thus, if three cars are parked at the first floor, the lower dispatching landing, so their BS3 relays are deenergized, if the system is set for off hours service, and if no call is registered for the load car, the approach of the fourth car to that landing deenergizes its BS3 relay to close its BS3 contacts and while it levels at the landing its LA contact is closed thereby energizing the night service relays NS and NST. Both relays pickup immediately and relay NS drops out when deenergized, however, night selection timer relay NST is of the slow drop out type, e. g. a flux decay relay, so that its contacts remain actuated after those of relay NS have been deactivated.

The night selection relays prevent the unnecessary operation of shut-down cars by canceling the load assignment as an operating car levels at the bottom terminal by opening the holding circuits for all load relays CUL through their CUL front contacts, lead 361, and the NS(A) through NS(D) back contacts by opening the appropriate back contacts NS at line 89. The assignment of a second load car from the group parked at the terminal is prevented by opening corresponding NST contacts for the arriving car at line 99 so that the closure of the CUL contacts of the released load car at line 96 does not enable the next selected car to assume that assignment through its CUN contacts at lines 90, 93, 96 or 99. Instead the arriving car receives the load assignment through the circuit including front contacts NST and back contacts NS at lines 91, 94, 97 or 100. As the car levels and both night selection relays are energized, NST is closed and NS it open at lines 91, 94, 97 or 100. When the car has leveled and its LA contacts at line 167 have opened, NS drops out immediately closing contacts NS at line 89 and at lines 91, 94, 97 or 100, and NST due to its time delay drops out an interval thereafter. Thus, an energizing circuit is established momentarily for the load relay through the closed front contacts NST of the night selection timer relay and the closed back contacts NS of the night selection relay to leads 355 and 356, and thence to L–2. When the load relay CUL for that car pulls in its reestablishes its holding circuit through lead 361 and the then closed back contacts at line 89 of the night selection relays.

Dispatching of cars upward from the bottom terminal is effected by the up dispatching relays CUD(A) through CUD(D) of the several cars to issue a signal to the car starting circuits. The dispatching interval can be instituted and altered in a number of ways. It can be initiated from the issuance of the preceding dispatching signal, the manner chosen here to illustrate the invention, or from the moment of departure of the car from the terminal. Its length can be altered by the number of cars available at the terminals, the traffic demands on the system, or by timer mechanisms. In the system under consideration a car is dispatched only if a demand for service is registered although such a feature can readily be eliminated in other utilizations of this invention.

As described above, the dispatch interval is timed by a motor having a camming disk arranged to close contacts at certain points in the cycle of operation. These contacts for the lower terminal are AB in line 158 and BB in line 162 of Fig. IX. Contacts BB are closed before AB and function to stop the timer motor if there are no demands on the system warranting the dispatch of a car upward by operating dispatch timer holding relay DFU to open back contacts DFU in the power supply circuit to the bottom timer motor at line 76 of Fig. VI. If relay DFU is not energized upon the closure of contacts BB, the timer motor continues to rotate its cam, closing contact AB and thereby energizing up scheduling relay KU through its lower coil to close its contacts at line 106 and energize an up dispatch relay CUD.

The detent or stopping of the up dispatch motor as its BB contacts close occurs if any of several conditions exist to complete the circuit to relay DFU. If no car call or landing call for a uniquely served floor is registered for the load car, relay CBL will be energized to close its contacts at line 162. If no general landing calls have been registered to drop out landing call indicating relay SS at line 59, then its contacts at line 162 are also closed. Thus, the circuit energizing relay DFU is energized if no calls are registered which could be answered by the load car. Relay DFU is also energized on the heavy down service program in effect when contacts H6 at line 163 are closed, since on that program the dispatch relays are not influenced by the up scheduling relay inasmuch as contacts H6 at line 105 by-pass the contacts KU of that relay to complete the energizing circuit for the dispatch relays CUD. Timed dispatching from the lower terminal is also dispensed with while the down peak program is in effect as when contact H3A of the program throwover switch is closed at line 164. When no car is assigned as a load car, as where no car has returned to the lower terminal, the auxiliary up car selection relay CULC is energized to close its contacts at line 165 and detent the up dispatch timer until a car is given a load assignment or the dispatcher is reset by opening contact RF, of the up dispatcher reset relay (not shown), as is ordinarily provided for operation by the supervisory personnel.

Once the up dispatch timer motor has driven its cam beyond the BB contact, it continues to rotate closing contacts AB at line 158. If the up dispatcher reset relay has been operated, it opens contacts RF at line 158 to prevent energization of up scheduling relay KU by closure of contacts AB unless manual dispatch contacts MDT in line 159 have been closed.

In the normal operation of the system the lower KU coil is energized by the timer driven contacts AB to reset the scheduling relay thereby permitting contacts KU at line 106 to close. As shown at line 157 of Fig. IX relay KU is latched in its energized state each time a car departs upward from the lower dispatching terminal by the engagement of brush 350 for that car with floor selector contact 361. This circuit is completed before the brush opens its connection with contact 350 to insure energization of the up scheduling relay latch coil KU before the up load and dispatch relays for that car are dropped out by the opening of its contacts MG at lines 82, 84, 86 or 88 and to maintain that energization until after MG drops out. Relay KU is energized when an in-service car, one having its OE contacts at line 157 closed, is set for upward travel by the closure of contact UF of its up field relay. In the present system the response of cars A and B to certain calls for tenth landing service prevents energization of relay KU when the car departs by opening its top landing starting time relay contacts TST. This feature is not illustrated for cars C and D which have their floor selector car position indicating contacts 361(C) and 361(D) connected in parallel with those of cars A and B, as represented by the arrow-tipped branch and the floor selector contact 361(C) at line 156, to latch relay KU upon their upward departure from the lower terminal.

The up dispatch relays CUD shown in Fig. VII for the several cars were conditioned for individual energization by the up load relay CUL of the assigned load car. When car A is given the load asignment by virtue of the energization of relay CUL(A) it closes contacts CUL(A) at line 112 to partially complete the circuit for up dispatch relay CUD(A) to lead L-2 through lead 362 to a series family of parallel pairs of up dispatch back contacts CUD and failure relay front contacts F, one pair being provided for each car in the bank at lines 105 and 106. The circuit is completed either through the heavy down program relay contacts H6, closed when the system is on that program to give an immediate dispatch signal to a car as the CUL contacts or their equivalents are closed, or through the reset of latched contacts KU which are open until the timer closes its AB contacts.

It may be noted here that it is sometimes desirable to insure that a car is maintained subject to its load assignment for a minimum time. When such is desired, the detent interval of the timer is often adequate as are the door opening circuits (not shown) which may be photoelectrically actuated to maintain the door open a given interval after the passage of the last passenger through the doorway. Another technique is to interpose a slow pickup relay (not shown) between the load assignment relay and the dispatch relay so that the pickup of the load relay CUL actuates the slow pickup relay which after a suitable minimum loading time picks up to close a contact substituted for the CUL contacts illustrated at lines 105, 107, 109 or 112.

The up dispatch relay CUD(A) seals itself in by closing contacts CUD(A) at line 111 to complete an energizing path to lead 355 and then locks out all other up dispatch relays by opening contacts CUD(A) in line 105. In the event that the car is prevented from leaving the dispatching terminal as where an object in its entrance prevents closure of its doors a dispatch release or by-pass must be effected for the remaining cars. This by-pass is imposed around the open CUD(A) contacts at line 105 after a given interval by closing contact F(A) to enable energizing current for the car having its up load relay energized to flow around the open contact. The means actuating failure timer contact F(A) is not shown. It can be a conventional motor driven timer whose operation is initiated by the issuance of a dispatch signal and terminated by the car departure. The timer can also be arranged to relatch the up scheduling relay KU by means not shown.

When an up dispatching signal is issued by relay CUD(A), it releases the up load relay CUL(A) by opening contacts CUD(A) at line 88 and initiates the starting of car A by closing contacts CUD(A) at line 172 of Fig. X to complete a circuit through the starter's car holding switch SCL to lead 363 thence through the closed advance motor stopping relay contacts VR2, closed emergency relay contacts EM, the closed door opening relay contacts OP1 to car starting relay CS and door close relay CLA. The circuit energizing these relays is completed through attendant throwover switch contacts TO which are closed at line 173 while the car is operating without attendant control, through in-service relay contacts OE, and start time relay contacts TR which are closed a given interval after the car doors are opened, to the source through main line 364. Pickup of car starting relay CS actuates further car starting circuits of conventional form (not shown). Relay CLA closes contacts CLA at line 179 to energize door closing relay CL1 which in turn seals in relays CS and CLA by contacts CL1 at line 175. The door closing relays actuate other door closing circuits (not shown) to enable the car to be set for starting.

Several alternative car starting circuits are shown in Fig. X. When the car is set for operation by a attendant throwover switch (not shown), contacts TO are displaced from their illustrated positions. Contacts TO between lead 365 to the source and lead 363 by-passing the dispatching contacts are closed in this instance. Under attendant control, one of the manually closed contacts 366 or 367 must be closed by the attendant to energize the relays CS and CLA as above through the closed front contacts TO at line 176 while back contact TO is opened at line 177 to avoid sealing in the relays CS and CLA. With contacts TO at line 173 open, the car thus requires the attendant to maintain his starting contact 366 or 367 closed until the door attains its fully closed position. Instant dispatch contacts ID at line 176 enable the dispatcher or supervisor to start the car by manually closing a contact at his control station. Often all instant dispatch contacts are ganged so that all cars are issued a dispatching signal simultaneously. Such contacts are employed to overcome blockages in the system which tie up one or more of the cars. Systems employing dispatching downward are also provided with down dispatch relay contacts CDD as shown in line 175 in the start circuits of each car.

Cars A and B are also provided with special starting circuit contacts TST at line 177 actuated by calls from the landing which they alone serve. The function of contacts TST will be reviewed in detail below. It will be noted that the starting circuit of car C shown in Fig. XI, also representing car D, is identical to that of cars A and B with the exception of the absence of top landing service relay contacts or other special service functioning contacts arranged to by-pass the manual or automatic dispatching means. Cars C and D have been arranged to illustrate the starting of cars in response to calls at the landings which they alone serve through the dispatching sequence rather than by by-passing that sequence.

Fragments of the hall lantern circuits showing the eighth through tenth landing for cars A and C appear in Fig. XII. Hall lanterns 368 are arranged in the usual manner at the universally served intermediate floors to indicate to prospective passengers the direction of travel of cars approaching and assigned to stop at a landing and cars standing at a landing. Such lanterns for the eighth landing indicating downward travel are shown at line 198 while those indicating upward travel are shown at line 196. Ordinarily the circuits for the lanterns at the intermediate landings are established through contacts on the floor selector machine when engaged by appropriate brushes. The down lanterns are actuated from contacts 369 in a lane engaged by brush 370 which is connected to a series of contacts on line 197 by direction throwover relay contacts RL at line 198 which are closed while the car is set for downward travel. Similarly, up lanterns receive their power through contacts 371 in a lane engaged by brush 372 connected to the contacts on line 197 by contacts RL at line 196. These latter RL contacts are the counterpart of those on line 198 and are closed when the direction throwover relay (not shown) is set for downward travel. The lantern circuits are powered from source 373 through lead 374 to taps 375 extending to the individual lanterns 368. From the lanterns the taps 375 extend to floor selector contacts 369 or 371 which are engaged by brushes 372 and 370 carried by the crosshead of the floor selector. A car set for downward travel, as shown, has its lower RL contact closed to enable down direction lanterns to be energized if the remainder of the circuit to main lead 376 is completed. The by-pass relay contacts BP are closed if the car is in service and not set to by-pass landing calls. In order to establish the circuit before an approaching car has fully stopped rheostat relay contacts RH are closed by dropping out the rheostat relay (not shown) as the deceleration of the car for that stop is initiated. The lantern is illuminated continuously until the car starting circuit is actuated at which time the back contacts CS of the car starting relay open.

At the ninth landing down load relay contacts CDL of cars C or D are closed in line 195 to energize the down lantern and a similar circuit at line 192 energizes the down lantern at the tenth floor for cars A or B when they are present and assigned as the down load car. Conventional lantern circuits operate the ninth floor up lantern for cars A and B at line 193; however, the circuits are somewhat modified at line 194 for the car A and B down lanterns at the ninth floor by a supplemental circuit which signifies the anticipated arrival of a car A or B while that car is at the tenth floor. This circuit functions in parallel with that of the floor selectors to light the down lantern at nine by closing service indication relay contacts SP to indicate the availability of a car at the tenth landing which will be able to serve ninth down calls, and the closure of contacts S9D of the ninth down landing signal relay in response to a demand for service downward. Thus, when car A or B is at the tenth floor, car C or D is not the down load car, and a ninth landing down call is registered, the down lantern for the available car of cars A or B is lighted at the ninth landing.

The preceding discussion of the general operation of the system has been concerned primarily with regular car selection, car load assignment and car dispatching upward. The features affording service to those floors served by less than all the cars will now be considered as they affect signalling and car operation. As pointed out in regard to Fig. II a car call requiring travel to the tenth landing can be registered only on cars A and B while one requiring travel to the fifth landing can be registered only on cars C and D. Accordingly, registering means for those landings are provided only in those cars. The registration of a call for these landings actuates relay CBT for A or B or CB5 for C or D. The car selection circuits for the up dispatching have been arranged to alternate in selection between cars serving the tenth landing and those serving the fifth landing to effectively distribute service. In the event that a rapid response to these special landings is desirable some means must be provided to dispatch a car out of its regular turn. However, it would be undesirable to dispatch a car, as car A or B to the tenth landing, if its counterpart is currently subject to a dispatch signal, inasmuch as that other car will serve the landing promptly. Thus, by virtue of the alternate selection feature, if either of cars A or B are the load car or have a dispatch signal, they are dispatched in due course, but if neither of these conditions exist and either car A or B is available for dispatching upward, it is dispatched upon registration of a call for service at the tenth landing without disrupting the regular dispatching sequence by the operation of a top landing starting time relay TST individual to each of cars A and B. Relay TST is energized only when its car is selected as next to be given the load assignment by virtue of the closure of contacts CUN at line 32. If a tenth landing serving car is the load car, the selection relay for its sister car is barred from operation as outlined above to bar operation of relay TST for that car. Relay TST further requires the registration of a car call requiring travel to the tenth landing, represented by the closure of contacts CBT at line 32, or the registration of a landing call requiring such service, signified by the closure of top landing signal relay contacts STA at line 33. In addition to those alternative conditions, operation of relay TST by virtue of a landing call also requires that up signal direction relay contacts UL of the sister car, car B, remain closed, signifying that the car has not been set for upward travel, or the closure of both the up dispatch relay contacts CUD and the bottom dispatching floor relay contacts MG for the other tenth floor serving car, signifying that the other car does not have an upward dispatch signal while still at the lower terminal. If the conditions are such as to operate TST, it is apparent that the regular dispatching sequence will not satisfy the demand for tenth landing service in a reasonable interval.

Relay TST in operating accelerates the departure of a car to the tenth floor without upsetting the dispatching sequence by issuing an immediate starting signal to car A or B either automatically or as a signal to the operator and the starter, and by preventing the reset of the scheduling relay as the car departs from the lower terminal. This relay is of the slow drop out type. Upon being energized it closes contacts TST in the car starting circuit of Fig. X at line 177 to energize the car starting and door closing relays CS, CLA and CL1 if the car is operating without an attendant. If the car is operating with an attendant, the closure of contacts TST at line 177 have no effect because the attendant throwover switch contacts TO are displaced to positions requiring the closure of contacts 366 or 367 to start the car. In this case the service demand is indicated to the attendant by operation of a lamp 377 and a gong in Fig. XIII which are energized from leads 378 and 379 by the closure of contacts TST at line 201 to complete a circuit through lead 380 and the now closed attendant throwover contacts TO at line 203. It will be appreciated that this circuit and that supplying the parallel lamp 381 in the dispatcher's control panel can also be energized while set for attendant operation by closure of the up dispatch relay contacts CUD(A) at line 202 or the down dispatch relay contacts CDD(A) at line 203.

In order to avoid latching relay KU as TST initiates the start of a car, back contacts TST at line 157 of Fig. IX are opened to break the circuit between contact 361 of the latching circuit and the latch coil of relay KU. This interruption of the circuit is maintained for an interval sufficient to enable the brush 350 and the car to move beyond the position where it might be reestablished by arranging the delay in drop out interval of timing relay TST long enough to permit this movement. The initial movement of brush 350 drops out relay MG to break the circuit at line 86 or 88 of Fig. VII dropping out relay CUN to deenergize TST. The drop out interval therefore is measured from this point.

Service to the fifth landing is provided exclusively by cars C and D. The system is arranged to dispatch car C within two dispatch intervals of the instant of call registration due to the alternate dispatching of cars serving the tenth and fifth landings under normal operation wherein those cars are made available for dispatching and the service demands are sufficient to maintain the cars in service. If the service demand falls off so that the up dispatch timer motor is detented by opening contact DFU at line 73 of Fig. VI, the delay in service to the fifth landing can become excessive if a car which is incapable of serving that landing is currently assigned as the load car. Accordingly, the system is arranged to dispatch either car C or D for a fifth landing call if no calls exist which are to be served by cars A and B. If car C or D is available for normal dispatch by virtue of its load car status, it will be dispatched in the usual dispatching sequence. If car A or B is the load car and the timer motor is detented for lack of a call to be served by that car, the system will dispatch car C if it is available at the terminal and if not available it will dispatch car D if available. The dispatch of either car C or D will prevent the dispatch of its sister car for a time long enough to allow the dispatched car to answer the call.

A call for fifth landing service registered in cars C or D energizes a CB5 relay for that car if the service has not been locked out by key operated switch 5FA at line 31. An up landing call for the fifth landing closes contacts S5U at line 64 to energize relay 5U and a down landing call closes contacts S5D at line 65 to energize relay 5D. Each of these relays in addition to their function in the highest call circuits at line 56 as described above, deenergize fifth landing call timing relay S5T which is of the slow drop out type so that its back contacts at line 104 close after a given interval, to establish a portion of the energizing circuit for relay CUD(D). Energization of fifth landing dispatching relay 5F at lines 61 or 63 closes its contacts in the dispatching circuits at lines 102 and 104, and opens its back contacts in the on call dispatch control relay circuits CBL at line 160.

A car call for the fifth landing is registered in car call circuits of the on call dispatch control relay CBL by operating relay CB as described above to open contacts CB at line 160. The opening of either contacts CB or 5F at line 160 for car C or D deenergizes dispatch timer holding relay DFU, if that car is the assigned load car, by breaking the circuit to CBL at both line 159, contacts CUL, and line 160, contacts CB or 5F. With CBL deenergized to indicate a call unique to the load car, contacts CBL at line 162 are open to break that energizing path for the down dispatch timer holding relay DFU. The car is then dispatched in the usual manner by the running of the up dispatch timer motor to drive its cam to the position closing contact AB at line 158 of Fig. IX to reset up scheduling relay KU and close back contacts KU at line 106 of the Fig. VII dispatching circuits.

If car A or B were the assigned load car, car C or D would be selected as the next car to be given the load assignment if either was available at the terminal before car A or B was dispatched, Therefore, if calls were in registration to continuously run the up dispatch motor timer, car C or D would be given the load assignment at the time car A or B was dispatched and would be dispatched at the end of the next dispatching interval.

If the timer were detented while car A or B had the load assignment for lack of a hall call which that car could serve or for lack of a car call, car C or D would be blocked in the dispatching sequence unless provided with some means of taking precedence in dispatching over the load car. Such means offering precedence has been provided to instantly dispatch car C or D under these circumstances in response to a car call for the fifth landing or in the case of car C, in response to a landing call. Car D will be dispatched for a landing call a predetermined interval after the registration of the call if car C fails to be dispatched or a second predetermined interval after car C is given a dispatching signal if it fails to cancel the landing call. Further, car C or D cannot be dispatched by a car call for a given interval after its sister car is dispatched. If car A or B is the load car and relay DFU is energized to detent the up dispatch timer so that contacts DFU at line 103 of Fig. VII are closed, the registration of a car call closes contacts CB5 at line 101 for car C or at line 103 for car D thereby completing the energizing circuit for the updispatch relay CUD of the car. This circuit for car C can be traced from L–1 through contacts MG(C) at line 84, lead 378, coil CUD(C), lead 379, contacts CB5(C), contacts 5FD, and contacts DFU to line L–2. Relay CUD(C) seals itself in at line 106, contacts CUD(C), to lead 355 and lead 356 to line L–2 and is dropped out when car C leaves the up dispatching terminal by the opening of contacts MG(C). Fifth landing dispatch exclusion relay 5FD at line 68 of Fig. IV is actuated by a dispatch signal to either car C or D by virtue of the closure of contacts CUD(C) at line 68 or CUD(D) at line 67 and opens its back contacts 5FD at lines 101 and 103 of the dispatching relay circuits for an interval determined by fifth landing response timer relay 5FT. Thus, only a momentary dispatching signal is developed by the fifth landing call or fifth car call circuits. Closure of contacts 5FD at line 69 seals in relay 5FD and contacts 5FD at line 66 initiates the timing of the interval which relay 5FD will be held in. Relay 5FT is of the slow pickup type and is adjusted to pull-in in an interval slightly in excess of that required for a car to travel from the up dispatching terminal to the fifth landing. When relay 5FT pulls-in, it breaks the holding circuit for relay 5FD causing contacts 5FD at lines 101 and 103 to close and enabling the dispatching circuits so that a second dispatching signal for fifth landing service registered thereafter will be effective to immediately dispatch a car. Car D is similarly actuated by fifth landing service requirements and car C blocked through corresponding circuits.

Registration of a fifth landing call operates relay 5F and deenergizes relay S5T of Fig. IV. Since S5T is of the slow drop out type its back contacts at line 104 remain open for a given interval after the registration of a call sufficient for dispatching car C if it is available. The closure of contacts 5F at line 102 for car C and line 104 for car D tend to initiate dispatch of both cars upon the landing call registration. However, open back contacts S5T in series with contacts 5F of the car D circuits prevent the completion of its dispatching circuit and introduce a preference for the dispatching of car C. When a reasonable interval for the issuance of a dispatching signal has expired, contacts S5T close and issue a dispatching signal to car D by energizing relay CUD(D). If car C is present at the up dispatching terminal and is in service, its relay CUD(C) is energized to close its contacts CUD(C) in line 68 of Fig. IV and energize fifth landing dispatch exclusion relay 5FD before the closure of contacts S5T whereby the dispatching circuit for car D is broken by opening back contacts 5FD at line 103.

Ordinarily car C or D is rapidly dispatched when the system is detented since there is little likelihood that they will be delayed in leaving the terminal by entering passengers under conditions of reduced traffic. When they depart their MG contacts at lines 82 or 84 of Fig. VII are opened to drop out their CUD relays and reestablish the dispatching circuit through the family of CUD back contacts at line 105.

Alternative systems for dispatching car A or B to the tenth landing can be made dependent upon the detenting of the dispatch timer much as in the case of the dispatch of cars C and D as by providing a path to L-2 which can be completed to energize the up dispatch relays for cars A and B directly through circuits including front contacts from the up dispatch timer holding relay DFU. Advantageously, the registering means for top landing service should be maintained separate from those for the remaining landings. Such a path can be completed by landing call relay contacts such as the top landing signal relay STA or alternatively by top landing car button relay CBT in parallel therewith. Again these circuits can be arranged to be deactivated as by back contacts of the load relays CUL for both cars A and B placed in series in each dispatch relay circuit while a car serving the top landing has the load assignment and can be dispatched normally within a dispatching interval. Such an arrangement enables a car to be instantly dispatched if the dispatch timer is detented and the load car is not capable of serving the top landing. The instant dispatch will not disrupt the normal dispatching sequence if another call is registered for other than the top terminal since the assigned car maintains its load assignment and is dispatched upon the closure of the AB contacts of line 157 as described above.

While the above description has been directed in the main to upward dispatching, it is to be recognized that downward dispatching is also applicable to this type of system and gives rise to some new considerations particularly where the several cars of the system travel to different upper terminals and are dispatched from those terminals. The present system has provided a tenth landing as the upper terminal for cars A and B and a ninth landing as the upper terminal for cars C and D. It is arranged to dispatch cars A and B from the tenth landing and C and D from the ninth as a unitary operation employing common car selection, load assignment, and dispatching equipment. Further, the preference in assignment is set up such that the tenth landing cars, cars A and B are given the load assignment if available so that in passing the ninth landing they also serve it. This preference enables the system to utilize the cars more effectively since it also is arranged to block the dispatching and load functions of cars C and D while either of cars A and B are in a position to serve the ninth landing readily.

The selection, load assignment and dispatching equipment for downward travel is shown in Fig. VIII. In general it is similar to that for upward travel shown in Fig. VII. Car selection is effected by means of down load relays CDL which pickup at successively higher currents established by a reactance coil 380 which permits the current to build up gradually. The order of load preference is the inverse of that at the bottom terminal to distribute car operation more uniformly so car A has the highest preference, its load relay CDL(A) picks up with the least current, while the remaining load relays pickup with successively higher currents in the order A through D. In order to more sharply define the pickup current each relay but CDL(A) is locked out by operation of the next preceding relay in the order so that operation of CDL(A) opens back contact CDL(A) at line 127 to bar operation of CDL(B), etc.

As in the circuits of Fig. VII, the relay circuits are activated for the respective cars by the arrival of the car at its top terminal to engage brush 350 of Fig. IX with contact 381 and energize relay MG1 at line 141. When a plurality of cars have their MG1 contacts at lines 129, 127, 125 or 123 closed, the CDL relay having the lowest pull in current is energized to lock itself in at lines 128, 126, 124, or 122, lock out all other down load relays at line 121, and select its down dispatch relay CDD at lines 137, 135, 133 or 131. As shown in Fig. IX relay CDL also opens its back contacts at line 145 to deenergize its auxiliary down dispatch timer holding relay DFDA and at line 146 to break one path of the circuit energizing its down dispatch timer holding relay DFD. Down dispatch is then effected in Fig. VIII by the closure of one of the contacts joining lead 382 to lead 383 after a suitable interval as determined by minimum time top dispatching relay CDT which is deenergized upon the opening of a CDL contact at line 121 and drops out after a suitable interval, one reasonable for unloading the car, to close back contact CDT at line 131. The series of contacts having an H as a prefix in their reference characters are actuated by program selection relays (not shown) and introduce immediate dispatching from the top terminal for those programs.

The down dispatch timer motor 342 of Fig. VI is controlled in the same manner as the up timer. Down dispatch timer holding relay DFD at line 146 of Fig. IX when energized opens its back contact DFD at line 73 of Fig. VI to break the circuit to down timer motor armature 342. Energization of relay DFD is accomplished by means of the closure of top timer cam actuated contacts BT at line 146 while the system is set for other than off hours operation, with off hours program relay contact H4 closed. Downward dispatching is not employed in several programs, hence, the relay DFD is continuously energized during such programs to detent the timer motor. Closure of heavy up program relay contacts H5 at line 148, up peak program relay contacts H1 at line 149, or down peak program throwover contacts H3A at line 151 will maintain relay DFD energized during their respective programs. Similarly, contacts DFDA at line 150 detent the timer until a down load car is assigned, opening one of the CDL contacts in line 145 to deenergize auxiliary down dispatch timer holding relay DFDA. Since on call dispatching is also used in the downward direction, the paths at lines 146 and 147 maintain relay DFD energized when contacts BT are closed until a car call is registered in the load car opening the parallel contacts CDL and CBD for that car, or a hall call is registered to open landing call indication relay contact SS. The lower dispatching terminal has been chosen as the main terminal, hence, it is desirable to avoid the accumulation of cars at the upper terminal landings. Down three-car relay back contacts BD at line 146 are opened to deenergize relay DFD and to initiate the issuance of a down dispatch signal to the down load car when more than two cars are available at the top terminal landings. The circuits actuating contacts BD are well known and therefore have not been shown.

Three contacts AT, BT and CT are operated by the top dispatch timer cam. Contacts AT at line 144 complete the energizing circuit for lower or reset coil KD of the down scheduling relay to close contacts KD at line 135 of Fig. VIII and effect a timed dispatching of the cars. If conditions in the system are appropriate to otherwise complete the circuit to relay DFD, the timer motor is detented by closure of contacts BT, advantageously about one quarter of a dispatching cycle earlier than the normal closure of contacts AT. As will be explained below, cam operated back contacts CT at line 154 reset mechanisms which function when car A or B is given a load assignment by opening at some time after the car has been issued a dispatch signal, for example one half a cam cycle after contacts AT are closed.

When a down dispatch relay is energized through its down load relay contact CDL at line 131, 133, 135 or 137, the family of down dispatch back contacts CDD at line 131, and one of the program contacts or the down scheduling relay contacts KD, the relay is sealed in to lead 384 by contacts CDD at lines 136, 134, 132 or 130 and the remaining relays of the group are sealed out by the opening of a back contact at line 131. The load relay for that car is dropped out by opening back contacts CDD at lines 129, 127, 125 or 123 thereby enabling the next load selection and assignment to be made by a relay in the CDL family. If for any reason the car is unduly held at its top terminal, as for a given interval the failure timer relay for that car (not shown) operates to close its contacts F at line 132 by-passing the open CDD contacts for that car and enabling a next load car to be dispatched.

Operation of a down dispatch relay also energizes a car starting circuit as described above with respect to Figs. X and XI and issues a start signal to the starter and, if on attendant operation, to the attendant as shown and described for Fig. XIII. Departure of the car latches the upper coil of the down scheduling relay KD at line 143 of Fig. IX by engaging brush with floor selector contact 385 while down field relay contact DF is closed, as when the car is set for travel downward.

When it is desired that cars A and B serving the tenth landing be utilized more fully and that cars C and D at the ninth landing be dispatched only when cars A and B are absent from their terminal, switch 386 is closed at line 154. This activates equipment which delays the resetting of the ninth down landing signal by cars C and D until they receive their load assignment, delays the selection of cars C and D as the down load cars for an interval from the load assignment of car A or B to sometime after the dispatch of that car, and activates the down landing signal lantern for car A or B at the ninth landing while that car is at the tenth landing. Car A or B is thus enabled to satisfy promptly the needs of passengers at the ninth landing without dispatching cars C and D. Switch 386 energizes ninth landing terminal limiting relay 9LTL to open back contacts 9LTL at line 47 of Fig. III so that the down ninth landing call reset circuit can be activated by cars C and D while at the ninth landing only when those cars are given the down load assignment and contacts CDL(C) or CDL(D) at line 47 are closed. Contacts 9LTL are closed at line 123 in the down load assignment circuits of Fig. VIII to substitute a circuit which will exclude cars C and D from those available for selection for down load assignments under certain conditions and back contacts 9LTL at lines 123 and 125 are opened to break the dispatch selection circuits formerly available for cars C and D. Service indication relay SP is conditioned for operation by closure of contacts 9LTL at line 152.

If a car is available for selection at the tenth landing, the load relay circuits select it in preference to those which might be available at the ninth landing as described. When either of relays CDL(A) or CDL(B) pull in, they close contacts at lines 152 or 153 which complete the energizing circuit for service indication relay SP if the off peak program is in effect and its program relay contacts H2 at line 152 are closed. Relay SP seals itself in by closing its contacts SP at line 154 to complete a circuit through top timer, normally closed contacts CT, the down dispatch timer holding relay back contacts DFD, and contacts SP all in line 154, thence through closed contacts 9LTL, the SP coil and contacts H2 to line 353. Service indication relay contacts SP at line 194 in the down hall lantern circuit for the load car of car A or B at the ninth landing of Fig. XII are closed as are down load relay contacts CDL for that car so that the hall lantern is lighted if a down landing signal is registered to close contacts S9D. This lighted condition of the lantern is maintained during the dispatching of the car and until its brush 370 engages the floor selector contact 309(A) at the ninth landing by down dispatching timer relay contacts CDDT in parallel with CDL. This timer relay is energized as relay CDL is dropped out by the energization of down dispatching relay CDD to close its contacts at line 193. Relay CDDT is of the slow drop out type and hence maintains front contact CDDT closed for an interval exceeding that between the departure of car A or B from its top dispatching terminal and the arrival of carriage brush 370 at ninth landing contact 369N. Illumination of the down ninth landing lantern for a second car at the tenth landing after it is selected as the load car and before the ninth landing signal has been reset by the dispatch car is prevented by back contact CDDT of the dispatched car in the lantern circuit for the assigned car as shown at line 195.

Relay SP also prevents the transfer of the down load assignment to cars C and D by opening its back contacts SP at line 122 of Fig. VIII to break the initial energizing paths for the CDL(C) and CDL(D) relays. This circuit is maintained broken for a substantial portion of the dispatching interval following the dispatch of a car from the tenth landing until the holding circuit for SP is opened by the down dispatch timer, cam operated, back contact CT at line 154.

Figs. XIV through XVII show a second system embodying features of this invention wherein dispatching is effected from a terminal only upward. The system is arranged to dispatch either car A or B ahead of cars C or D for calls requiring travel to the tenth landing if there are no other calls registered which could be served by cars C and D. Cars are returned to their dispatching terminal at their highest call and under certain conditions a simulated highest call can be imposed on each car individually to establish a limit to their upward travel.

Generally, the system of Figs. XIV through XVII corresponds to the system of Figs. II through XIII and in view of this correspondence portions of the system have not been illustrated. Where possible like reference characters have been applied to like elements in the two systems.

The second system can be considered as a four car system having two cars, cars A and B, serving landings 1 through 10, and two cars, cars C and D, serving landings 1 through 9. Cars B and C are also arranged to serve a landing below the first, e. g. a basement landing. Car call circuits of the type shown in Fig. II and including signals for fifth landing buttons for cars A and B and basement buttons for cars B and C can be employed in this system. Landing call reset circuits as shown in Fig. III are suitable for this system. The landing call controls including highest call controls are essentially those of Fig. IV but contain sufficient differences to warrant an abbreviated representation as shown in Fig. XIV.

While most of the elements and reference characters therefor correspond to those tabulated for the system of Figs. II through XIII, the distinctions between the two embodiments dictate the use of certain additional elements. Those additional relays having their actuating coils shown are:

| | |
|---|---|
| CUB(B) and (C) | Basement service car selection relay. |
| CULT | Up load timer relay. |
| S | Landing signal stopping relay. |
| SD | Highest down call stopping relay. |
| S1 | Landing signal stopping relay. |
| 10F | Tenth landing service relay. |
| 10FA | Tenth landing service relay. |
| 10FB | Tenth landing service relay. |
| 10FD | Tenth landing service relay. |
| 10FT | Tenth landing service timing relay. |

The additional contacts either manually operated or actuated by coils which are not shown comprise:

| | |
|---|---|
| BS(B) and (C) | Basement service relay. |
| LBP(A) to (D) | Load by-pass relay. |
| MGA(A) to (D) | Up dispatching landing relay. |
| RH4(A) to (D) | Rheostat relay. |
| RT(A) to (D) | Round trip button. |
| SA(B) and (C) | Dispatching terminal stopping relay. |

Under the usual operating programs cars are returned to the dispatching terminal by a highest call control including highest call relays HCT and HBT which are energized at the highest call to reverse the upward travel of the cars and start them downward from those calls. A normally closed family of landing signal relay contacts S2D through S9D are connected in series and have floor selector machine contacts connected in parallel to taps 317 connected to the series between the up landing signal relay contacts and the down landing signal relay contacts at each landing. Floor selector machine brushes 324 for each car engage the contacts for that landing corresponding to the effective position of that car to energize the highest call relays of an up traveling car when it reaches its highest landing call through the closed contact family above it, the brush 324, contacts 10F and CB(A), junction 400, coil HBT, lead 401 at line 214 for car A to junction 402 and from junction 400 through lead 403, contacts BP and UF, coil HCT, contact RH4 to junction 402 and thence to the lead 404 through round trip contacts RT which are closed when it is desired to reverse the car at a highest call below the ninth landing. Presence of a car call opens back contacts for the car signal above relay CB at line 214 for car A or line 216 for car C to prevent actuation of the highest call circuits until the highest car call has been answered. When round trip contacts RT are opened, cars C and D travel to the ninth floor before being reversed by circuits which are not shown while cars A and B can be reversed by the highest call circuits when those cars are at the ninth landing since cam actuated, normally open, floor selector contacts 405 are closed at that time by a cam (not shown) on the carriage of the floor selector to by-pass the open RT contacts.

A landing call requiring travel to the tenth landing is registered by closing the ninth landing up call contacts S9U at line 220 or the tenth landing down call contacts S10D at line 221 to energize the tenth landing service relays 10F and 10FA from source 406 through lead 407 the contacts and coils to lead 404. Back contacts 10F in the highest call circuits of cars A and B at line 214 are thus opened to register a call above the ninth down signal of the landing signal relay family.

A simulated highest call can be imposed on the circuits of Fig. XIV for individual cars so that each of the several cars can be limited in upward travel to floors below a selected landing. In the circuit shown, car C is provided with such a limit up to and including the third landing and car A up to and including the eighth landing. The remaining cars can be limited similarly. Down peak operation employs this system to advantage. It is established by the downward displacement of switch 408 at lines 225 and 227 to complete an energizing circuit for down peak throwover switch H3A from lead 407, through lead 409, branch 410, down peak throwover switch limit contacts 411, and contacts 408 to lead 404. As the driving element H3A completes its function it opens contacts 411 and closes corresponding contacts 412 in branch 413 to condition the energizing circuits for H3A to re-open its several contacts when switch 408 is displaced upward. Actuation of the H3A contacts deactivates the upper portion of the series family of landing signal relay contacts at line 213 by opening back contacts H3A, by-passes the car call control of the highest call circuits offered by contacts CB at line 214 for car A and line 216 for car C by closing front contacts H3A at lines 214 and 216 respectively, and inserts individual simulated highest calls by connecting the floor selector contact 316 of the highest call circuit which corresponds to the landing to which upward travel of that car is to be limited to the line 407. In the illustration car C is limited in upward travel to the third landing by closing contacts H3A in line 217 and car A is similarly limited to the eighth landing by closing contacts H3A at line 215. Each simulated call is maintained individual to the chosen car by disconnecting the floor selector machine contact 316 upon which it is imposed from the series family of landing call contacts, as by opening back contacts H3A in line 214 to disconnect contact 316 of car A for the eighth landing from the junction point 413 between the up and down eighth landing call contacts and disconnecting third landing contact 316 for car C by opening its back contacts H3A at line 216. Under down peak operation relays 10F and 10FA need not function, hence back contacts H3A at line 220 are opened to disconnect them from source 406.

The landing call stopping circuits of Fig. XV illustrate a conventional form of such circuits modified for this invention by the provision of means stopping the tenth landing serving cars at the ninth landing in the absence of a down tenth landing or up ninth landing signal. Thus, if car A or B departed upward from its last stop with a call above and that call were canceled by another car, the limit of upward travel would be the ninth landing. At the ninth landing, landing signal stopping relay S would be energized as would highest down call stopping relay SD by the engagement of landing signal stopping circuit brush 414 of the floor selector with the ninth landing contact 415 of the down landing signal lane of floor selector contacts. With the car set for up travel, up field relay contacts UF at line 234 would be closed to contact 415, and contacts 10F would be closed in the absence of a call requiring service to the tenth landing thereby energizing contact 415. The energizing circuits would be completed by brush 414 to relay SD since contacts HCT at line 236 would be closed upon the cancellation of the call above that car by operation of the highest call circiuts of Fig. XIV. Relay SD when energized reverses the direction determining relays (not shown) to energize the down direction determining relay and close its DL contacts at line 233. Since the highest call relay contacts HCT at line 233 are closed, the rheostat relay contact RH4 at line 234 is closed while the car is running, the by-pass relay contact BP at line 234 is closed until the car is set to by-pass by the supervisory personnel as is the load by-pass contact LBP at line 235 until the car load attains a certain level, and the brake relay contact BK is closed while the car is in motion, relay S is energized to actuate stopping circuits and initiate stopping of the car. This relay is sealed in by its contacts S at line 232 to maintain it energized while the car is stopping and until the brake is applied, opening contacts BK. Cars A and B are provided with the circuit of Fig. XV. Cars C and D differ from Fig. XV in that the 10F and UF contacts at line 233 and 234 are absent.

The up dispatch timing functions are accomplished in this system by a motor driven timer driving a cam which actuates a pair of contacts AB and BB in the manner described above with respect to Figs. V, VI and IX to control upward dispatching functions paralleling those discussed with respect to Fig. VII. Accordingly, much of this disclosure has not been repeated for this system. The distinctions arise primarily out of the requirements imposed by the provision for service to a landing below the first landing or dispatching terminal such as a basement landing. The system also includes means to prevent a car arriving from below the dispatching terminal with a car call for service above the terminal from being introduced into the dispatching sequence or altering the dispatching of other cars. One of the two cars, car B, serving the landing below the terminal also serves the extreme upper landing and therefore requires some unique equipment. Cars which go below the terminal are withheld from the selection briefly in order to enable them to be selected for service to the lower landing if another such car has not been employed in satisfying the need. The car serving the tenth landing requires special selection means when it is to be dispatched to serve the tenth landing in order to avoid undesired interactions with the service requirements below the terminal. Further cars can be dispatched for top floor service successively in response to landing signals only after an interval calculated to enable the first to satisfy its initiating signal. The means for accomplishing these results suggest the desirability of disclosing the up selection, load assignment and dispatch means for this system even though some material may be repetitious of that set forth above.

Fig. XVI shows the circuits for the up scheduling relay KU and the up dispatch timer holding relay DFU. The up scheduling relay is actuated to a latched position by energizing upper coil KU at line 243. This energization is accomplished each time a car travels upward from the dispatching terminal by the momentary engagement of its floor selector contact 416 by its brush 417. Coil KU is energized for any car if in-service relay contacts OE are closed, if landing signal stopping relay back contacts SA are closed, and if the up field relay contacts UF are closed. Landing signal stopping relay SA (not shown) is energized when a car is below the up dispatching terminal and a car call for service above that terminal is registered and is maintained energized until the car passes the dispatching terminal. Thus, its contacts SA at lines 242 or 244 are opened to prevent disruption of the scheduling when the car will not be introduced into the dispatching sequence. A similar circuit is provided in the dispatching landing relay MGA circuits for cars B and C (not shown) so that an open SA contact also prevents their operation while the car is at that landing.

Reset coil of the upscheduling relay KU at line 246 is energized by the up dispatch timer cam operated contacts AB, line 247, at regular intervals under normal operation and can be operated manually as by the supervisor of the car bank by means of the push button 418 at line 246.

The up dispatch timer motor is detented by DFU back contacts as shown in Fig. VI. Relay DFU is controlled by cam operated contacts BB at line 249 which momentarily are closed ahead of the closure of contacts AB. If no car has been assigned the up load, all CUL contacts at line 247 are closed and the timer is detented by energizing relay DFU when contacts BB close. The timer is also detented during the down peak program set up by the closure of contacts H3A at line 250. The present system is dispatched "on call" in the manner discussed above and hence relay DFU is energized if no landing call is registered between back contacts S2D and S9D of Fig. XIV to energize relay SS and open its back contacts at line 249, or if no call which can be uniquely served by the load car is registered by opening contacts CUL for that car at line 248 and corresponding car signal relay contacts CBS or, in the case of cars A and B serving the tenth landings, tenth landing service relay contacts 10F in line 249.

The arrival of a car at the first or up dispatching terminal landing from above, or from below with no car call for service above, closes contacts MGA at lines 257, 259, 261 or 263 for that car to condition it for introduction into up selection, load assignment and dispatching if the car has not been assigned for service below that landing as signified by the opening of basement service relay back contact BS in lines 259, or 261 for cars C and B. The first car to arrive energizes its up next car relay CUN from lead L-1 connected to a source of direct current as shown in Fig. VI through closed contacts MGA, BS, CUD of its up dispatch relay, CUL of its up load relay, and, if other than car A, CUN of the up next car relay for the car preceding it in selection preference to coil CUN. From coil CUN the circuit is completed through back contacts CUN to lead 419, the family of CUN contacts at line 263 and reactance coil 420. The reactance coil 420 and the back contacts CUN of the next preceding car in the selection sequence function as described above to insure that car A if available is selected first and that the preference descends from car A through car D in that order.

Energization of an up next car relay CUN will establish a holding circuit and prepare an energizing circuit for its up load relay CUL while locking out any additional selections by another up next car relay all as described above. Thus, in general an up load relay CUL is pulled in dropping out the CUN relay, sealing itself in, blocking out another load assignment and conditioning an energizing circuit for an up dispatch relay CUD which is completed by the closure of up scheduling relay contacts KU at line 276 to issue a dispatch signal to the car as set forth.

Usually up load timer relay CULT at line 256 is energized through the path including basement service car selection relay back contacts CUB(B) and CUB(C) to open back contact CULT at line 270. This bars the load assignment of cars B and C by preventing the energization of their up load relays CUL(B) and CUL(C).

The arrival of car B or C at the dispatching terminal under conditions enabling them to be introduced into the dispatching sequence energizes their relay MGA to close contacts MGA at line 252 or 254. This energizes the basement service car selection relay CUB for that car through closed up load and up dispatch relay back contacts CUL and CUD at lines 252 or 254 thereby opening contacts CUB in line 256 to deenergize relay CULT. Relay CULT is of the slow drop out type and after an interval, for example two seconds, it drops out closing contacts CULT at line 270 and enabling that car to receive its load assignment unless it has been given a signal to serve the basement in the drop out interval. If it is to be sent to the basement, back contacts BS open during the interval contacts CULT are open removing it from the dispatching sequence. As soon as the up load is assigned to that car by operation of relay CUL, it opens the energizing circuit for relay CUB by opening back contact CUL at line 252 or 254 and this condition is maintained by the up dispatch relay contacts CUD when the load car is given its dispatching signal until the car leaves the dispatching terminal and opens contacts MGA. If one basement serving car is out of service, its in-service relay back contact OE at line 251 or 253 is closed to maintain relay CUB of its sister basement serving car energized despite the up load assignment or up dispatch of the car.

The service needs of the tenth landing are assigned by tenth floor service relay 10FB which is energized when car A is the only car available for such service as is the case when car B has its basement car selection relay CUB(B) deenergized to close contact CUB(B) at line 254 and car A is at the dispatching terminal maintaining MGA(A) at line 255 closed. Under these conditions, if the up dispatch timer holding relay DFU is energized as where no calls for service below the tenth floor are registered, car A or B can be dispatched upon the registration of a call requiring service to the tenth landing unless they are the load car. If they are the load car and the timer is detented, the detent is released to dispatch them in due course. If car C or D is the load car and the timer is detented, car A or B is dispatched upward by the registration of a tenth landing car call since it energizes the up dispatch relay CUD(A) through lead 421, closed tenth landing contacts CBT(A) at line 279 and closed contacts DFU at line 280, or, for car B, relay CUD(B) through lead 422, tenth landing contacts CBT(B) at line 282, and contacts DFU.

Only one of cars A or B is available for immediate response to a landing call requiring travel to the tenth landing at any one time, and the disability of a second of those cars is continued for a time sufficient after dispatch of the one for that one to cancel the call actuating its dispatch. Thus, if car B is at the terminal, its relay CUB(B) is energized while another car has the load assignment. Contacts CUB(B) at line 254 are opened to maintain tenth floor service relay 10FB deenergized and its contact 10FB at line 280 open so that car A is non-responsive to tenth landing calls. At this time contacts CUB(B) at line 281 are closed to connect up dispatch relay CUD(B) to the landing call contacts. When CUB(B) is not energized 10FB is and car A will respond to landing calls.

The nature of the landing call actuation of cars A or B to the tenth landing can best be appreciated by considering Fig. XIV. The energization of relay 10FA has been explained as responsive to a ninth landing up signal or a tenth landing down signal to close contacts 10FA at line 280 of Fig. XVII thereby energizing an up dispatch relay CUD(A) or CUD(B) to issue a dispatch signal to car A or B. Relay CUD(A) or CUD(B) closes its contacts at lines 224 or 225 to energize tenth landing service relay 10FD which energizes tenth landing service timing relay 10FT by closing contacts 10FD at line 222, sealing its holding circuit by closing contacts 10FD at line 223, and disabling the landing signal dispatching circuit by opening contacts 10FD at line 280. Relay 10FT is of the slow pickup type and is adjusted to pickup in an interval slightly in excess of the time it would take a car to be dispatched and travel to the tenth landing. When it picks up it breaks the holding circuit for relay 10FD permitting back contact 10FD at line 280 to reclose and to enable the landing signal portion of the tenth landing immediate dispatch circuit.

While the features of the present invention have been disclosed in conjunction with a particular form of car selection and dispatching system they can readily be adapted to other systems without departing from the spirit or scope of the invention. Accordingly, it is to be understood that the above described embodiments are intended to illustrate the invention and modes of its utilization and they are not to be read as placing limitations on the invention.

What is claimed is:

1. An elevator system comprising a plurality of cars, a plurality of landings served by one or more of said cars, one of said landings being served by at least one and less than all of said plurality of cars, a second of said landings other than said one landing comprising a dispatching landing, a given car serving certain of said plurality of landings including said one landing, means to select a car for dispatching, means to establish a dispatching interval between cars, means to issue a starting signal to a selected car at said dispatching landing at the termination of a dispatching interval, means for registering service requirements for said one landing, and means responsive to said registering means for issuing a starting signal to said given car when at said dispatching landing at least upon the termination of the current dispatching interval.

2. An elevator system comprising a plurality of cars, a plurality of landings served by one or more of said cars, one of said landings being served by at least one and less than all of said plurality of cars, a given car serving certain of said plurality of landings including said one landing, a landing from which cars are dispatched, means to select for dispatching a car which is effectively present at said dispatching landing, means to establish a dispatching interval between cars, means to issue a starting signal to a selected car responsive to the termination of a dispatching interval, means for registering service requirements for said one landing, and means responsive to said registering means for selecting said given car when at said dispatching landing and for issuing a starting signal to said selected given car at least upon the termination of the current dispatching interval.

3. An elevator system comprising a plurality of cars, a plurality of landings served by one or more of said cars, one of said landings being served by at least one and less than all of said plurality of cars, a second of said landings other than said one landing comprising a dispatching landing, a given car serving certain of said plurality of landings including said one landing, means to select for dispatching a car which is effectively present at said dispatching landing, means to establish a dispatching interval between cars, means to issue a starting signal to a selected car at the termination of a dispatching interval, means for registering service requirements for said one landing, means immediately responsive to said registering means for issuing a starting signal to said given car when stopped at said dispatching landing, and means for disabling said last mentioned means in response to the selection of said given car for dispatching.

4. An elevator system comprising a plurality of cars, a plurality of landings served by one or more of said cars, one of said landings being served by at least one and less than all of said plurality of cars, a given car serving certain of said plurality of landings including said one landing, a landing from which cars are dispatched, means to select for dispatching a car which is effectively present at said dispatching landing, means to establish a dispatching interval between cars, means to issue a starting signal to a selected car at the termination of a dispatching interval, means for registering service requirements for said one landing, and means responsive to said registering means for immediately issuing a starting signal to said given car at said dispatching landing.

5. An elevator system comprising a plurality of cars, a plurality of landings served by one or more of said cars, one of said landings being served by at least one and less than all of said plurality of cars, a given car serving certain of said plurality of landings including said one landing, a landing from which cars are dispatched, means to select a car for dispatching, means to establish a dispatching interval between cars, means to issue a starting signal to a selected car at the termination of a dispatching interval, means for registering service requirements for said one landing, and means responsive to the selection of said given car by said selecting means and the operation of said registering means while said car is selected to issue immediately a starting signal to said given car at said dispatching landing.

6. An elevator system comprising a plurality of cars, a plurality of landings served by one or more of said cars, one of said landings being served by at least one and less than all of said plurality of cars, a plurality of given cars serving certain of said plurality of landings including said one landing, a landing from which cars are dispatched, means to select a car for dispatching, means to establish a dispatching interval between cars, means to issue a starting signal to a selected car at the termination of a dispatching interval, means for registering service requirements for said one landing, sensing means to ascertain the inability of a given car to immediately respond to said registering means, and means responsive to the selection of a given car by said selecting means, the inability of other of said given cars to respond as sensed by said sensing means, and the operation of said registering means while said car is selected to issue immediately a starting signal to said given car at said dispatching landing.

7. An elevator system comprising a plurality of cars, a plurality of landings served by one or more of said cars, one of said landings being served by at least one and less than all of said plurality of cars, given cars serving certain of said plurality of landings including said one landing, said operating given cars constituting a certain proportion of the total number of operating cars, a landing from which cars are dispatched, means to select cars available at said dispatching landing for dispatching, and means to interspace given cars in said selection by said selecting means in accordance with said certain proportion.

8. An elevator system comprising a plurality of cars, a plurality of landings served by one or more of said cars, one of said landings being served by at least one and less than all of said plurality of cars, a first one-half of said plurality of cars serving certain of said plurality of landings including said one landing, a second one-half of said plurality barred from serving said one landing, a landing from which cars are dispatched, means to dispatch cars from said landing and means to select alternately for dispatching cars from said first and second halves of said plurality.

9. An elevator system comprising a plurality of cars, a plurality of landings served by one or more of said cars, one of said landings being served by at least one and less than all of said plurality of cars, a first one-half of said plurality of cars serving certain of said plurality of landings including said one landing, a second one-half of said plurality barred from serving said one landing, a landing from which cars are dispatched, and means to issue successive starting signals alternately to cars from said first and second halves of said plurality which are located at said dispatching landing.

10. An elevator system comprising a plurality of cars, a plurality of landings served by one or more of said cars, one of said landings being served by at least one and less than all of said plurality of cars, given cars serving certain of said plurality of landings including said one landing, said operating given cars constituting a certain proportion of the total number of operating cars, a landing from which cars are dispatched, and means to issue successive starting signals at intervals to said cars at said dispatching landing in a succession interspacing said given cars with the remainder of said plurality in accordance with said certain proportion.

11. An elevator system comprising a plurality of cars, a plurality of landings served by one or more of said cars, one of said landings being served by at least one and less than all of said plurality of cars, given cars serving certain of said plurality of landings including said one landing, said operating given cars constituting a certain proportion of the total number of operating cars, a landing from which cars are dispatched, means to issue successive starting signals at intervals to said cars at said dispatching landing in a succession interspacing said given cars with the remainder of said plurality in accordance with said certain proportion, means for registering service requirements for said one landing, and means responsive to said registering means for issuing a starting signal to said given car at least upon the termination of the current interval.

12. An elevator system comprising a plurality of cars, a plurality of landings served by one or more of said cars, one of said landings being served by at least one and less than all of said plurality of cars, a given car serving certain of said plurality of landings including said one landing, a landing from which cars are dispatched, means for registering service demand, dispatching means issuing start signals to cars of said plurality at said dispatching landing at intervals only when certain service demands are registered, means for registering service requirements for said one landing, and means immediately issuing a starting signal to said given car in response to the registration of a service requirement for said one landing in the absence of other service demands.

13. An elevator system comprising a plurality of cars, a plurality of landings served by one or more of said cars, one of said landings being served by at least one and less than all of said plurality of cars, a plurality of given cars serving certain of said plurality of landings including said one landing, a landing from which cars are dispatched, means to select a car for dispatching, means to establish a dispatching interval between cars, means to issue a starting signal to a selected car at the termination of a dispatching interval, means for registering service requirements for said one landing, means responsive to said registrating means for issuing a starting signal to a first given car, and means to prevent the issuing of a starting signal to a second given car within a predetermined interval following the issuance of a starting to a first given car.

14. An elevator system comprising a plurality of cars, a plurality of landings served by one or more of said cars, a plurality of proximate dispatching landings, means to issue start signals at intervals to initiate movement of cars in a given direction from said dispatching landings, a first of said dispatching landings being displaced from a second of said dispatching landings in said given direction, and means responsive to the presence of a car at said second landing to establish a preference for issuing start signals to cars at said second dispatching landing as opposed to cars at said first dispatching landing.

15. An elevator system comprising a plurality of cars, a plurality of landings served by one or more of said cars, a plurality of proximate dispatching landings, means to issue start signals at intervals to initiate movement of cars in a given direction from said dispatching landings, a first of said dispatching landings being displaced from a second of said dispatching landings in said given direction, means responsive to the presence of a car at said second landing to establish a preference for issuing start signals to cars at said second dispatching landing as opposed to cars at said first dispatching landing, and means to maintain said preference for issuing start signals from said second dispatching landing for a given interval after the issuance of a start signal for a car at said second dispatching landing.

16. An elevator system comprising a plurality of cars, a plurality of landings served by one or more of said cars, a plurality of proximate dispatching landings, means to issue start signals at intervals to initiate movement of cars in a given direction from said dispatching landings, a first of said dispatching landings being displaced from a second of said dispatching landings in said given direction, means responsive to the presence of a car at said second landing to establish a preference for issuing start signals to cars at said second dispatching landing as opposed to cars at said first dispatching landing, and means to prevent the issuing of start signals from said first dispatching landing for a given interval after the issuance of a start signal for a car at said second dispatching landing.

17. An elevator system comprising a plurality of cars, a plurality of landings served by one or more of said cars, a plurality of proximate dispatching landings, means to issue dispatching signals for movement of cars in a given direction from said dispatching landings, a first of said dispatching landings being displaced from a second of said dispatching landings in said given direction, landing call registering means at said first dispatching landing, means to reset said landing call registering means upon the stopping of a car at said first dispatching landing, and means responsive to the presence of a car at said second dispatching landing to prevent the operation of said reset means at said first dispatching landing.

18. An elevator system comprising a plurality of cars, a plurality of landings served by one or more of said cars, a plurality of proximate dispatching landings, means to issue dispatching signals for movement of cars in a given direction from said dispatching landings, a first of said dispatching landings being displaced from a second of said dispatching landings in said given direction, a first given car arranged for starting its travel in said given direction from said first dispatching landing, a second given car arranged for starting its travel in said given direction from said second dispatching landing, and means for establishing intervals between the dispatching signals issued to said given cars at said dispatching landings.

19. An elevator system comprising a plurality of cars, a plurality of landings served by one or more of said cars, a plurality of proximate dispatching landings, means to issue dispatching signals for movement of cars in a given direction from said dispatching landings, a first of said dispatching landings being displaced from a second of said dispatching landings in said given direction, a first given car arranged for starting its travel in said given direction from said first dispatching landing, a second given car arranged for starting its travel in said given direction from said second dispatching landing, landing call registering means at said first dispatching landing, means to reset said landing call registering means upon the stopping of a car at said first dispatching landing, and means to prevent the reset of said landing call registering means at said first landing by a first given car while a second given car is selected for dispatching at said second landing.

20. An elevator system comprising a plurality of cars, a plurality of landings served by one or more of said cars, a plurality of proximate dispatching landings, means to issue dispatching signals for movement of cars in a given direction from said dispatching landings, a first of said dispatching landings being displaced from a second of said dispatching landings in said given direction, a first given car arranged for starting its travel in said given direction from said first dispatching landing, a second given car arranged for starting its travel in said given direction from said second dispatching landing, landing call registering means at said first dispatching landing, means to reset said landing call registering means upon the stopping of a car at said first dispatching landing, and means to prevent the reset of said landing call registering means at said first landing by a first given car while a second given car is selected for dispatching at said second landing, and for a given interval after the dispatch signal is issued to a second given car.

21. In an elevator system, a plurality of cars, a plurality of landings, a first terminal landing served by all cars of said plurality, a second terminal landing beyond said first terminal landing and served by at least one of said cars and less than all of said cars, means to register a landing signal at each of said plurality of landings, a family of normally closed landing signal registration contacts each contact being controlled by one of said registering means and all contacts being connected in series, a tap for each car of said plurality to said contact series corresponding to each landing served by the respective car which is represented in said series, a contact connected to each tap and corresponding to said landings, a brush for each car of said plurality arranged for engaging said contact corresponding to the effective position of its respective elevator car, means connected to said brush and actuated by the absence of a landing call registered on one of said family of contacts for causing an up traveling car to reverse, and a contact intermediate said brush and said reversing means responsive to the registration of a landing signal at said second terminal to prevent the actuation of said reversing means.

22. In an elevator system, a plurality of cars, a plurality of landings, one of said landings served by at least one of said cars and less than all of said cars, means to register a landing signal at each of said plurality of landings, a family of normally closed landing signal registration contacts each controlled by one of said registering means and all connected in series, a tap for each car of said plurality connected to said contact series at points corresponding to landings served by the respective car which is represented in said series, a contact connected to each tap and corresponding to said landings, a brush for each car of said plurality arranged for engaging said contact corresponding to the effective position of its respective elevator car, translating means connected to said brush and actuated by the absence of a landing call registered on any one of said family of contacts in a given direction from the effective position of a car, and a contact intermediate said brush of the car serving said one landing and said reversing means responsive to the registration of a landing signal at said one landing to prevent the actuation of said translating means.

23. In an elevator system, a plurality of cars, a plurality of landings, means to register a landing signal at each of said plurality of landings, a family of normally closed landing signal registration contacts each controlled by one of said registering means and all connected in series, a tap for each car of said plurality of said contact series corresponding to each landing served by the respective car which is represented in said series, a contact connected to each tap and corresponding to said landings, a brush for each car of said plurality arranged for engaging said contact corresponding to the effective position of its respective elevator car, a source of electrical energy having one terminal connected to an end of said contact series and a second terminal connected to each of said brushes, means for each car intermediate said brush and said second terminal for causing said car to reverse when energized, and means for energizing a reversing means for an individual car without affecting the reversing means for other cars at least at the time said individual car effectively reaches a predetermined landing comprising means connecting the contact connected to the tap for said car corresponding to said predetermined landing to said source and means breaking the circuit between said contact and said series family of contacts.

24. In an elevator system, a plurality of cars, a plurality of landings, means to register a landing signal at each of said plurality of landings, a family of normally closed landing signal registration contacts each controlled by one of said registering means and all connected in series, a tap for each car of said plurality to said contact series corresponding to each landing served by the respective car which is represented in said series, a contact connected to each tap and corresponding to said landings, a brush for each car of said plurality arranged for engaging said contact corresponding to the effective position of its respective elevator car, a source of electrical energy having one terminal connected to an end of said contact series and a second terminal connected to each of said brushes, means for each car intermediate said brush and said second terminal for causing said car to reverse when energized, first means for energizing a reversing means for a first car at a given landing without affecting the reversing means of other cars in said plurality comprising means connecting the contact for said first car corresponding to said given landing for said first car to said source and means breaking the circuit between said contact and said series family of contacts, and second means for energizing a reversing means for a second car at a given landing without affecting the reversing means of other cars in said plurality comprising means connecting the contact for said second car corresponding to said given landing for said second car to said source and means breaking the circuit between said contact and said series family of contacts.

25. An elevator system comprising a plurality of cars, a plurality of landings served by one or more of said cars, one of said landings being served by at least one and less than all of said plurality of cars, a given car serving certain of said plurality of landings including said one landing, means to select a car for dispatching, means to establish a dispatching interval between cars, means to issue a starting signal to a selected car at the termination of a dispatching interval, the selection of a car and the issuance to that car of a dispatching signal defining a dispatching sequence, means for registering service requirements for said one landing, and means responsive to said registering means for issuing a starting signal to said given car within the dispatching sequence of the currently selected car.

26. An elevator system comprising a plurality of cars, a plurality of landings served by one or more of said cars, one of said landings being served by at least one and less than all of said plurality of cars, a first one-half of said plurality of cars serving certain of said plurality of landings including said one landing, a second one-half of said plurality barred from serving said one landing, means to select cars for dispatching, means to issue a dispatch signal to said cars, said selecting means being arranged for selecting a next car prior to the dispatching of the previously selected car and means to bar the selection of a next car from the half of said plurality of cars including said previously selected car until the dispatch signal has been issued to said previously selected car.

27. An elevator system comprising a plurality of cars, a plurality of landings served by one or more of said cars, one of said landings being served by at least one and less than all of said plurality of cars, a plurality of given cars serving certain of said plurality of landings including said one landing, a landing from which cars are dispatched, means for registering service demand, dispatching means issuing start signals to cars of said plurality at said dispatching landing at intervals only when certain service demands are registered, means for registering a service requirement for said one landing which is distinct from said certain service demands, means to establish a preference for service by one of said plurality of given cars to said one landing, and means immediately issuing a starting signal to said one given car in response to the registration of a service requirement for said one landing in the absence of other service demands.

28. An elevator system comprising a plurality of cars, a plurality of landings served by one or more of said cars, one of said landings being served by at least one and less than all of said plurality of cars, a plurality of given cars serving certain of said plurality of landings including said one landing, a landing from which cars are dispatched, means for registering service demand, dispatching means issuing start signals to cars of said plurality at said dispatching landing at intervals only when certain service demands are registered, means for registering a service requirement for said one landing which is distinct from said certain service demands, means issuing a starting signal to one of said given cars in response to the registration of a service requirement for said one landing, and means to bar a second one of said given cars from responding to a service requirement for said one landing for an interval after the issuance of said starting signal sufficient to enable said given car to serve said service requirement and to enable a second one of said given cars to respond to a service demand for said one landing thereafter.

29. An elevator system comprising a plurality of cars, a plurality of landings served by one or more of said cars, a plurality of proximate dispatching landings, means to issue start signals at intervals to initiate movement of cars in a given direction from said dispatching landings, a first of said dispatching landings being displaced from a second of said dispatching landings in said given direction, and means responsive to the presence of a car at said second landing to establish a preference for issuing start signals to cars at one of said dispatching landings as opposed to cars at said other dispatching landing.

30. In an elevator system, a plurality of cars, a plurality of landings, one of said landings intermediate the extremes of car travel served by at least one of said cars and less than all of said cars, means to register a landing signal at each of said plurality of landings, a family of normally closed landing signal registration contacts each controlled by one of said registering means and all connected in series, means to by-pass a contact of said series for said one landing for a car incapable of serving that landing, means to include said contact in said series for a car capable of serving that landing while said car is effectively on a given side of said landing, and means to by-pass said contact in said series for a car capable of serving that landing while said car is effectively on a side of said landing opposite said given side.

31. In an elevator system, a plurality of cars, a plurality of landings, one of said landings intermediate the extremes of car travel served by at least one of said cars and less than all of said cars, means to register a landing signal at each of said plurality of landings, a family of normally closed landing signal registration contacts each controlled by one of said registering means and all connected in series, a tap for each car of said plurality connected to said contact series at points corresponding to landings served by the respective car which is represented in said series, a contact connected to each tap and corresponding to said landings, a brush for each car of said plurality arranged for engaging said contact corresponding to the effective position of its respective elevator car, translating means connected to said brush and actuated by the absence of a landing call registered on any one of said family of contacts in a given direction from the effective position of a car, a contact intermediate said brush of the car serving said one landing and said reversing means responsive to the registration of a landing signal at said one landing to prevent the actuation of said translating means, and means to by-pass said contact when said car serving said one landing is effectively positioned in said given direction with respect to said one landing.

32. In an elevator system, a plurality of cars, a plurality of landings served by said cars, means for dispatching cars in a given direction, a dispatching landing, one landing served by a car spaced from said dispatching landing in a direction opposite said given direction, means to assign cars for dispatching while they are present at said dispatching landing, and means to delay the assignment of a car serving said one landing for a given interval after its arrival at said dispatching landing.

33. In an elevator system, a plurality of cars, a plurality of landings served by said cars, means for dispatching cars in a given direction, a dispatching landing, one landing served by a car spaced from said dispatching landing in a direction opposite said given direction, means to assign cars for dispatching while they are present at said dispatching landing, means to delay the assignment of a car serving said one landing for a given interval after its arrival at said dispatching landing, means for registering demands for service at said landings, and means to initiate service to said one landing during said delay in response to a registered demand for service at that landing.

34. An elevator system comprising a plurality of cars, a plurality of landings served by one or more of said cars, one of said landings being served by at least one and less than all of said plurality of cars, a given car serving certain of said plurality of landings including said one landing, means to select a car for dispatching, means to establish a dispatching interval between cars, means to issue a starting signal to a selected car at the termination of a dispatching interval, the selection of a car and the issuance to that car of a dispatching signal defining a dispatching sequence, means for registering service requirements for said one landing, means responsive to said registering means for issuing a starting signal to said given car within the dispatching sequence of the currently selected car, a dispatching landing, means to condition said dispatching means for the generation of a dispatching signal as a car departs from said dispatching landing, and means to disable said conditioning means for said given car when dispatched in response to service requirements at said one landing.

35. An elevator system comprising a plurality of cars, a plurality of landings served by one or more of said cars, a plurality of proximate dispatching landings, means to issue start signals at intervals to initiate movement of cars in a given direction from said dispatching landings, a first of said dispatching landings being displaced from a second of said dispatching landings in said given direction, landing signal registering means, service indication means at each landing, and means responsive to the presence of a car at said second landing and the operation of said signal registering means at said first landing to operate the service indication means at said first landing for said car.

36. An elevator system comprising a plurality of cars, a plurality of landings served by one or more of said cars, a plurality of proximate dispatching landings, means to issue start signals at intervals to initiate movement of cars in a given direction from said dispatching landings, a first of said dispatching landings being displaced from a second of said dispatching landings in said given direction, landing signal registering means, service indication means individual to each car at landings served by the cars, and means responsive to the presence of a given car at said second landing and the operation of said signal registering means at said first landing to operate the service indication means at said first landing for said given car and bar the operation of service indication means for other cars at said first landing.

References Cited in the file of this patent

UNITED STATES PATENTS 2,492,010   Santini _____ Dec. 20, 1949

UNITED STATES PATENT OFFICE
CERTIFICATE OF CORRECTION

Patent No. 2,860,728                                  November 18, 1958

Raymond A. Burgy

It is hereby certified that error appears in the printed specification of the above numbered patent requiring correction and that the said Letters Patent should read as corrected below.

Column 2, line 45, for "is an" read -- in an --; column 7, line 17, after "reference" strike out "char-" and insert instead -- character, a pickup coil above and a reset coil below.--; line 18, before "closure" insert -- The --; line 19, strike out "closure of a landing signal button, as 10, mementarily"; column 9, line 49, before "brush", second occurrence, strike out "which" and insert instead -- while --; column 30, line 38, after "starting" insert -- signal --.

Signed and sealed this 24th day of March 1959.

(SEAL)

Attest:

KARL H. AXLINE
Attesting Officer

ROBERT C. WATSON
Commissioner of Patents